US011831181B2

(12) United States Patent
Yokoyama et al.

(10) Patent No.: US 11,831,181 B2
(45) Date of Patent: Nov. 28, 2023

(54) POWER FEED SYSTEM FOR EVALUATING PLACEMENT BENEFITS OF POWER FEED MAT

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Katsuya Kobayashi, Okazaki (JP); Takahiro Hirano, Gotemba (JP); Midori Sugiyama, Susono (JP); Ryunosuke Yamashita, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/858,078

(22) Filed: Jul. 6, 2022

(65) Prior Publication Data

US 2023/0011985 A1    Jan. 12, 2023

(30) Foreign Application Priority Data

Jul. 8, 2021    (JP) .................................. 2021-113359

(51) Int. Cl.
| H02J 50/00 | (2016.01) |
| H02J 50/80 | (2016.01) |
| H02J 50/90 | (2016.01) |
| B60L 53/30 | (2019.01) |
| H02J 50/40 | (2016.01) |
| B60L 53/12 | (2019.01) |
| H02J 50/12 | (2016.01) |

(52) U.S. Cl.
CPC .............. *H02J 50/80* (2016.02); *B60L 53/12* (2019.02); *B60L 53/30* (2019.02); *H02J 50/12* (2016.02); *H02J 50/402* (2020.01); *H02J 50/90* (2016.02)

(58) Field of Classification Search
None
See application file for complete search history.

(56) References Cited

U.S. PATENT DOCUMENTS

| 2009/0106567 A1* | 4/2009 | Baarman ............... G06F 1/1628 |
| | | 713/300 |
| 2017/0179731 A1* | 6/2017 | Sindia ..................... H02J 50/10 |
| 2018/0175671 A1* | 6/2018 | Ren ......................... H01F 27/24 |
| 2019/0098122 A1* | 3/2019 | Harrison ................. G05B 9/02 |

(Continued)

FOREIGN PATENT DOCUMENTS

JP    2018-157686 A    10/2018

OTHER PUBLICATIONS

Website—RoboteQ. Available as of Nov. 26, 2018 at https://www.roboteq.com/all-products/robopads-charge-system (Year: 2018).*

(Continued)

*Primary Examiner* — Adi Amrany
(74) *Attorney, Agent, or Firm* — HAUPTMAN HAM, LLP

(57) ABSTRACT

A power feed system includes a computer that evaluates benefit obtained when a power feed mat is placed, for each of a plurality of locations within a subject region where the power feed mat can be placed, the power feed mat being configured to wirelessly feed power to a movable body. In a power feed method using such a computer, a display shows a result of evaluation of the benefit for each location within the subject region evaluated by the computer.

13 Claims, 17 Drawing Sheets

(56) References Cited

U.S. PATENT DOCUMENTS

| | | | |
|---|---|---|---|
| 2020/0303967 A1* | 9/2020 | Wong | H02J 50/80 |
| 2021/0197685 A1* | 7/2021 | Soon | H02J 7/02 |
| 2021/0200240 A1* | 7/2021 | Ware | G05D 1/0088 |
| 2022/0109331 A1* | 4/2022 | Ventimiglio | H02J 50/402 |
| 2023/0006480 A1* | 1/2023 | Yokoyama | H02J 7/00034 |
| 2023/0006481 A1* | 1/2023 | Yokoyama | H02J 50/90 |
| 2023/0145205 A1* | 5/2023 | Yokoyama | B60L 53/62 |
| | | | 320/108 |

OTHER PUBLICATIONS

Website—Wiferion. Available as of Feb. 1, 2021. https://www.wiferion.com/us/products/installation-for-inductive-charging-and-charging-stations-in-the-industry/ (Year: 2021).*

* cited by examiner

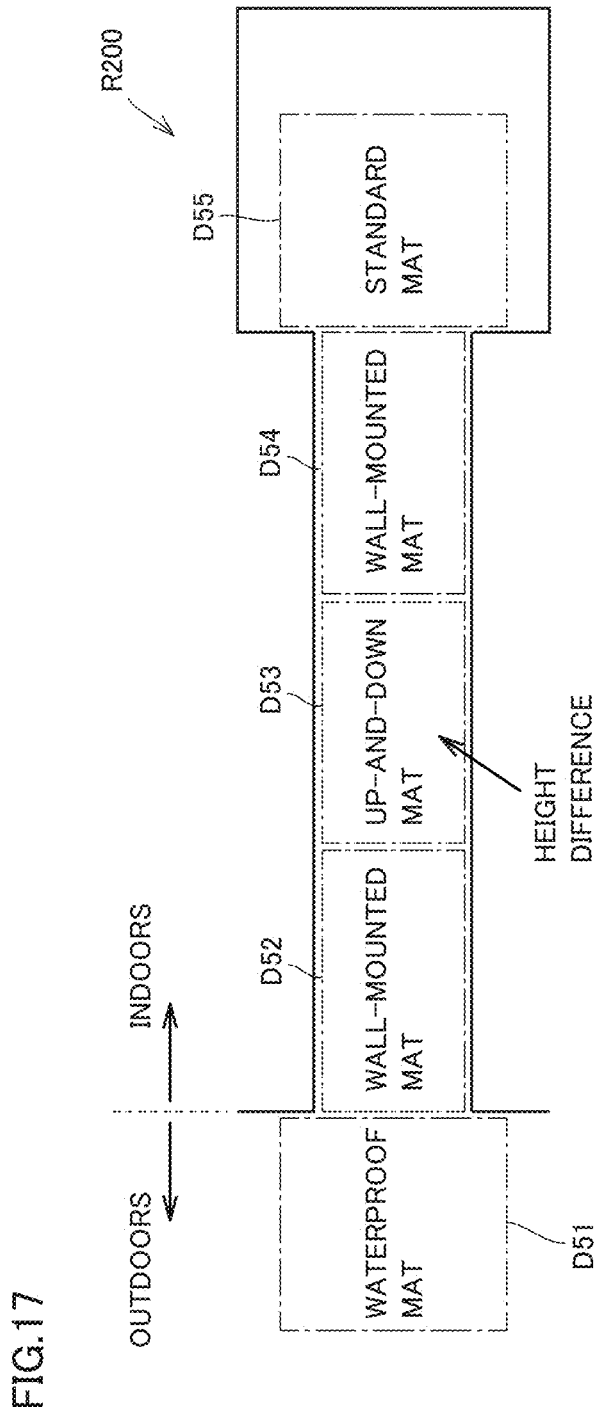

POWER FEED SYSTEM FOR EVALUATING PLACEMENT BENEFITS OF POWER FEED MAT

This nonprovisional application is based on Japanese Patent Application No. 2021-113359 filed with the Japan Patent Office on Jul. 8, 2021, the entire contents of which are hereby incorporated by reference.

BACKGROUND

Field

The present disclosure relates to a power feed system and a power feed method.

Description of the Background Art

For example, according to the disclosure in Japanese Patent Laying-Open No. 2018-157686, when a vehicle that travels on a power feed lane where a plurality of power feed units are provided along a lane senses presence of a foreign matter on a road in front of a vehicle body, the vehicle transmits a signal for stopping or suppressing power feed from power feed units present within a prescribed range in front and in the rear of a point where presence of the foreign matter is sensed.

SUMMARY

The power feed units described in Japanese Patent Laying-Open No. 2018-157686 are buried in the road. Each of the plurality of power feed units includes one power transmission coil. In contrast, the inventors of the present application propose a power feed mat that can readily be placed. The power feed mat is placed, for example, on a floor or a wall, and configured to wirelessly feed power to a movable body that comes closer thereto.

The power feed mat is high in degree of freedom of placement. Since there are many candidates for placement locations of the power feed mat, it is not necessarily easy for a user to select a placement location of the power feed mat.

The present disclosure was made to solve the problem, and an object thereof is to facilitate placement of a power feed mat at an appropriate location.

A power feed system according to a first point of view of the present disclosure includes a computer that evaluates benefit obtained when a power feed mat is placed, for each of a plurality of locations within a subject region where the power feed mat can be placed, the power feed mat being configured to wirelessly feed power to a movable body.

The computer is also referred to as an "evaluation computer" below. A location evaluated by the evaluation computer is also referred to as an "evaluation target." Benefit obtained when a power feed mat is placed at an evaluation target is also referred to as "placement benefit."

The evaluation computer may be a stationary server or may be mounted on a mobile terminal. Examples of the movable body include an uninhabited movable body (an automated guided vehicle (AGV), a drone, and the like) and a vehicle (a car, a boat, and the like).

The evaluation computer evaluates the placement benefit for each evaluation target within a subject region. A user can refer to the placement benefit evaluated by the evaluation computer in selecting a placement location of the power feed mat. Therefore, the evaluation computer can facilitate selection of the placement location of the power feed mat. Placement of the power feed mat at an appropriate location by the user is facilitated.

The evaluation computer may be configured to obtain information representing a result of observing (observation result), during a prescribed period for which at least one movable body is used in the subject region, at least one of a behavior of the at least one movable body, a remaining amount of stored power of the at least one movable body, and a density of people in the subject region. The evaluation computer may be configured to evaluate the placement benefit for each location within the subject region based on the information. The prescribed period is also referred to as an "observation period" below.

The evaluation computer evaluates the placement benefit based on the observation result, so that a proper evaluation result is more readily obtained.

The evaluation computer may be configured to evaluate a location where traffic of the at least one movable body is heavier during the observation period as being greater in benefit obtained when the power feed mat is placed.

It is expected that a frequency of use of a power feed mat is higher when the power feed mat is placed at a location where traffic of the movable body is heavy. The high frequency of use of the power feed mat means great placement benefit. According to the configuration, proper evaluation of the placement benefit is facilitated.

The evaluation computer may be configured to evaluate a location where a duration of stay of the at least one movable body is longer during the observation period as being greater in benefit obtained when the power feed mat is placed.

It is expected that a duration of use the power feed mat is long when the power feed mat is placed at a location where the duration of stay of the movable body is long. A long duration of use of the power feed mat means great placement benefit. According to the configuration, proper evaluation of the placement benefit is facilitated.

The evaluation computer may be configured to evaluate a location where a remaining amount of stored power of the at least one movable body has become smaller during the observation period as being greater in benefit obtained when the power feed mat is placed.

It is expected that a movable body small in remaining amount of stored power (that is, a movable body that requires power feed) can be fed with power from the power feed mat when the power feed mat is placed at a location where the remaining amount of stored power of the movable body becomes small. That the movable body requiring power feed can be fed with power from the power feed mat owing to placement of the power feed mat means great placement benefit. According to the configuration, proper evaluation of the placement benefit is facilitated.

The remaining amount of stored power of the movable body can be expressed, for example, with a state of charge (SOC) of a power storage included in the movable body. The SOC is, for example, representation of a ratio within a range from 0 to 100%, of a current amount of stored power to an amount of stored power in a fully charged state.

The evaluation computer may be configured to evaluate a location where the density of people is lower during the observation period as being greater in benefit obtained when the power feed mat is placed.

It is expected that the power feed mat is more readily available to the movable body when the power feed mat is placed at a location where a density of people is low. The power feed mat more readily available to the movable body means great placement benefit. According to the configuration, proper evaluation of the placement benefit is facilitated.

The evaluation computer may be configured to propose, based on the information, an improvement strategy for providing greater benefit when the power feed mat is placed at a placement location desired by a user is greater.

When there is a location where the user desires to place the power feed mat, the evaluation computer proposes an improvement strategy for increasing placement benefit of the placement location desired by the user. Therefore, placement of the power feed mat by the user at a location where the placement benefit is great is facilitated. According to the configuration, effective use of the power feed mat by the user is facilitated.

Examples of the improvement strategy include change of a layout within the subject region or modification to control of the movable body.

Any power feed system described above may further include a display. The evaluation computer may be configured to have the display show a result of evaluation of placement benefit for each location within the subject region.

According to the configuration, the evaluation computer makes the evaluation described previously and thereafter has the display show an evaluation result. Therefore, the user can see the evaluation result and then select a placement location of the power feed mat.

The evaluation computer may be configured to evaluate the benefit obtained when the power feed mat is placed as being greater, as the power feed mat is less likely to deteriorate. The evaluation computer may be configured to select a power feed mat greatest in placement benefit from among options including a plurality of types of power feed mats, for each location within the subject region.

According to the configuration, suppression of deterioration of the power feed mat after placement is facilitated.

Any power feed system described above may further include the power feed mat. The power feed mat may be flexible to such an extent that the power feed mat can be rolled into a cylinder. Since such a power feed mat can be rolled into a cylinder, it can easily be carried.

In any power feed system described above, the power feed mat may be formed by combination of a plurality of plate members. The power feed mat may be constructed as being disassemblable into a plurality of plate members. Each of the plurality of plate members may include at least one power transmission coil. Since such a power feed mat is constructed as being disassemblable into a plurality of plate members, it can easily be carried.

In any power feed system described above, the power feed mat may include a plurality of power transmission coils. The power feed mat may be configured to feed power to the movable body that is traveling over the power feed mat with the plurality of power transmission coils. According to such a configuration, the movable body can be fed with power from the power feed mat while the movable body travels.

A power feed method according to a second point of view of the present disclosure includes an evaluation step and a representation step which will be described below. In the evaluation step, a computer evaluates benefit obtained when a power feed mat is placed, for each of a plurality of locations within a subject region where the power feed mat can be placed, the power feed mat being configured to wirelessly feed power to a movable body. In the representation step, a display shows a result of evaluation of placement benefit for each location within the subject region.

According to the power feed method as well, similarly to the previously described power feed system, placement of the power feed mat at an appropriate location is facilitated.

The foregoing and other objects, features, aspects and benefits of the present disclosure will become more apparent from the following detailed description of the present disclosure when taken in conjunction with the accompanying drawings.

BRIEF DESCRIPTION OF THE DRAWINGS

FIG. 17 is a diagram showing an exemplary power feed mat selected for each location within a subject region that is shown in the processing shown in FIG. 14.

DESCRIPTION OF THE PREFERRED EMBODIMENTS

Figure 1:
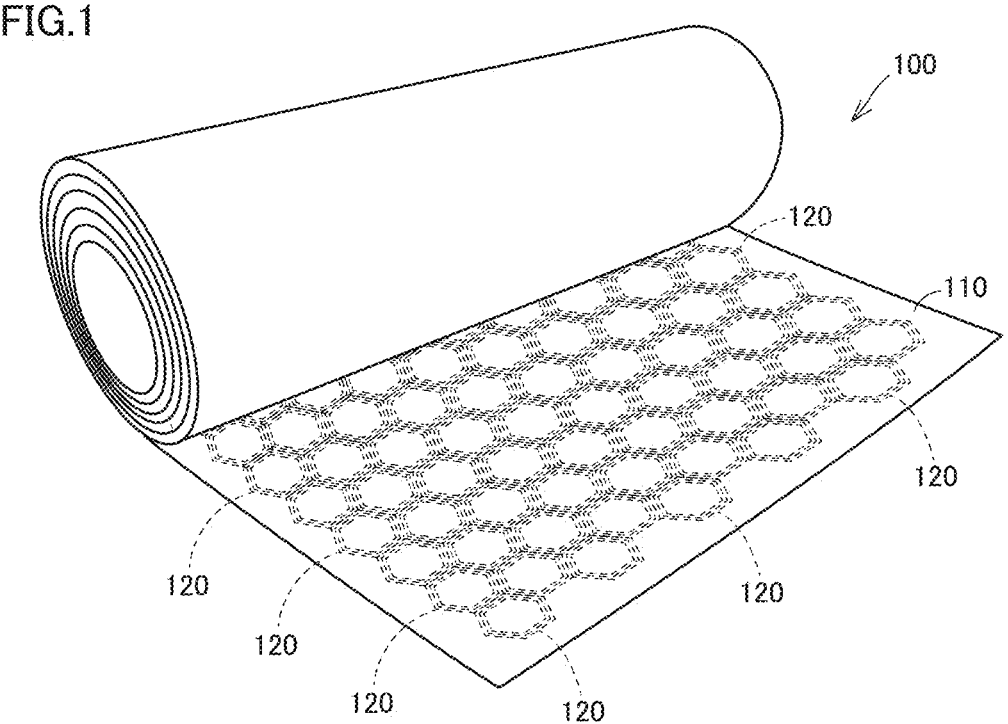
FIG. 1 is a diagram showing a power feed mat according to a first embodiment of the present disclosure.

An embodiment of the present disclosure will be described in detail below with reference to the drawings. The same or corresponding elements in the drawings have the same reference characters allotted and description thereof will not be repeated.

First Embodiment

FIG. 1 is a diagram showing a power feed mat according to this embodiment. Referring to FIG. 1, a power feed mat 100 includes a sheet substrate 110 and a plurality of power transmission coils 120 provided in the inside of sheet substrate 110. Power feed mat 100 is constructed as being portable. Power feed mat 100 has a light weight, for example, to such an extent that it can be carried by one person or several persons. A power supply facility (see FIG. 3) for power feed mat 100 which will be described later is constructed as being attachable to and removable from power feed mat 100. Power feed mat 100 is flexible to such an extent as being rolled into a cylinder. FIG. 1 shows power feed mat 100 partially rolled into a cylinder. The entire power feed mat 100 can also be rolled into a cylinder. By rolling power feed mat 100 into a cylinder, power feed mat 100 is more easily carried. Power feed mat 100 may be stored as being rolled into a cylinder. Power feed mat 100 can also be developed like a sheet. Power feed mat 100 is used as being developed (see FIG. 2 which will be described later). Power feed mat 100 can be handled as a rug. Power feed mat 100 is constructed as being placed on a floor indoors. Power feed mat 100 may be placed in a passage (for example, an intersection of passages) indoors. Power feed mat 100 may be placed on the floor and thereafter fixed by a removable retainer (for example, retaining hardware or a gripper).

In this embodiment, power feed mat 100 in a developed state has a rectangular outer geometry (two-dimensional shape). The outer geometry of power feed mat 100 is not limited to the rectangular shape but can be modified as appropriate. Power feed mat 100 may have an outer geometry in a polygonal shape (a triangular shape, a pentagonal shape, a hexagonal shape, or the like) other than a quadrangular shape, or a circular shape. In this embodiment, a plurality of power transmission coils 120 included in power feed mat 100 are contained in sheet substrate 110. Without being limited as such, power transmission coils 120 may be provided as being exposed at a surface of power feed mat 100. Sheet substrate 110 is formed, for example, of a resin. A material for sheet substrate 110 can be modified as appropriate. Power transmission coil 120 is formed, for example, of a metal. A material for power transmission coil 120 can be modified as appropriate. Power transmission coil 120 may be formed, for example, of a conductive resin. Power feed mat 100 may include any number of power transmission coils 120. The number of power transmission coils 120 may be equal to or larger than two and smaller than ten, equal to or larger than ten and smaller than one hundred, or equal to or larger than one hundred.

In this embodiment, on a mat surface (a main surface of power feed mat 100), the plurality of power transmission coils 120 are regularly disposed in matrix of rows and columns. Power transmission coils 120 are arranged, for example, in grids. Without being limited as such, arrangement of power transmission coils 120 can be modified as appropriate. Power transmission coils 120 may irregularly be arranged. Though power transmission coil 120 is formed in a regular hexagonal shape in a plan view in an example shown in FIG. 1, a shape of power transmission coil 120 can be modified as appropriate. A two-dimensional shape of power transmission coil 120 may be a polygonal shape (for example, a quadrangular shape) other than the hexagonal shape, or a circular shape. A size of power transmission coil 120 may also be modified as appropriate in conformity with an application (for example, a structure of a movable body that uses power feed mat 100) of power feed mat 100.

Figure 2:
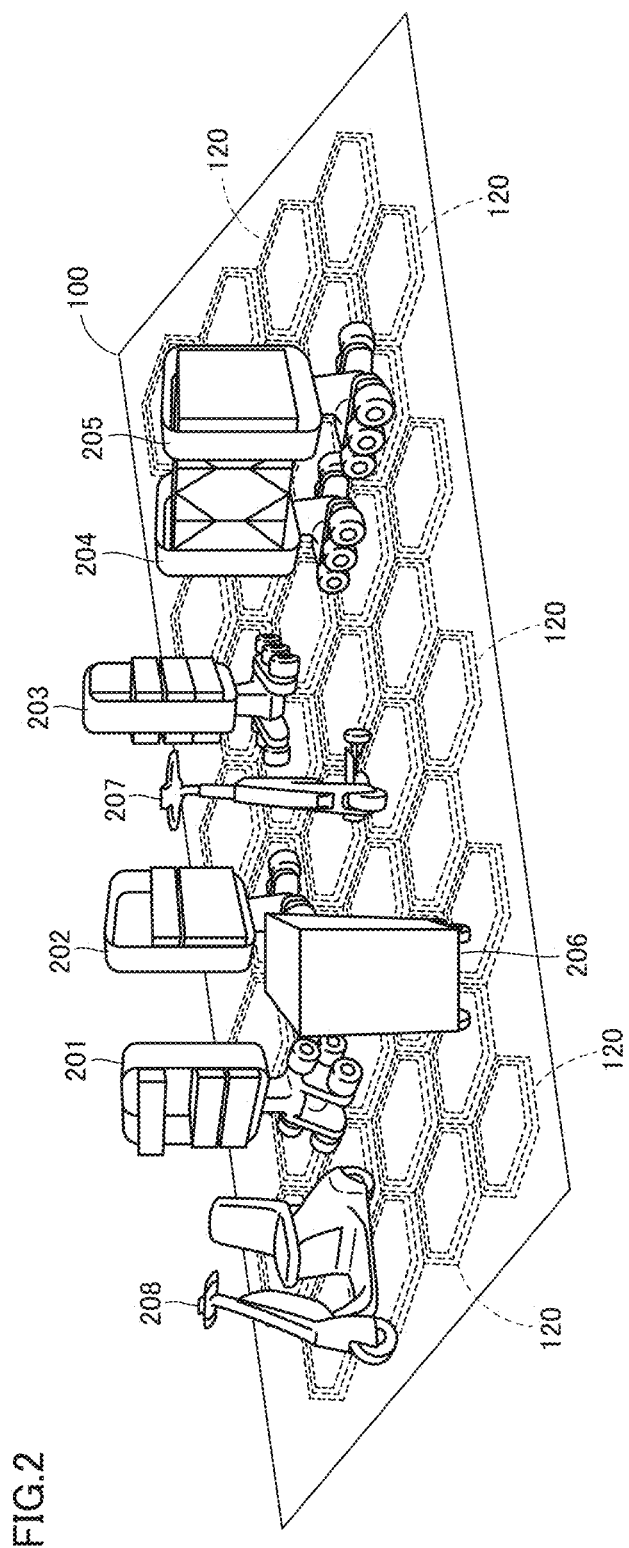
FIG. 2 is a diagram showing an exemplary state during use of the power feed mat shown in FIG. 1.

FIG. 2 is a diagram showing an exemplary state during use of power feed mat 100. In an example shown in FIG. 2, movable bodies 201 and 208 are on power feed mat 100. The plurality of power transmission coils 120 included in power feed mat 100 are configured to individually feed power to different movable bodies. Electric power is wirelessly fed to the movable body from power transmission coil 120 electromagnetically coupled to a power reception coil (secondary coil) of the movable body. Any wireless power transmission (WPT) technique may be applicable, and magnetic resonance or electromagnetic induction power transmission may be applicable. Another technique may be adopted.

Each of movable bodies 201 to 208 is a small battery electric vehicle (BEV) configured to travel indoors. Each of movable bodies 201 to 206 is an automated guided vehicle (AGV). Each of movable bodies 207 and 208 is a single-person battery electric vehicle.

Movable bodies 201 to 205 are AGVs of the same type. Each of movable bodies 201 to 205 is used for load transport. In the example shown in FIG. 2, each of movable bodies 201 to 203 carries a load alone. Movable bodies 204 and 205 carry in cooperation, a large load that cannot be carried by one movable body. Each of movable bodies 201 to 205 is suitable for indoor transport. Each of movable bodies 201 to 205 is referred to as an "AGV 200" below unless they are described as being distinguished from one another.

Movable body 206 is an AGV with a delivery box. The delivery box may be configured to be lockable and unlockable. A particular person (for example, a person who has successfully been authenticated) alone may be able to lock or unlock the delivery box. The delivery box may be configured such that a temperature therein is adjustable. The delivery box may be a cold storage.

Each of movable bodies 207 and 208 is configured to be adapted to both of manual drive by a driver on-board and autonomous travel without human intervention. Movable body 207 includes a handlebar. Movable body 208 includes a handlebar and a seat. Each of movable bodies 207 and 208 is suitable as a vehicle that moves indoors.

Figure 3:
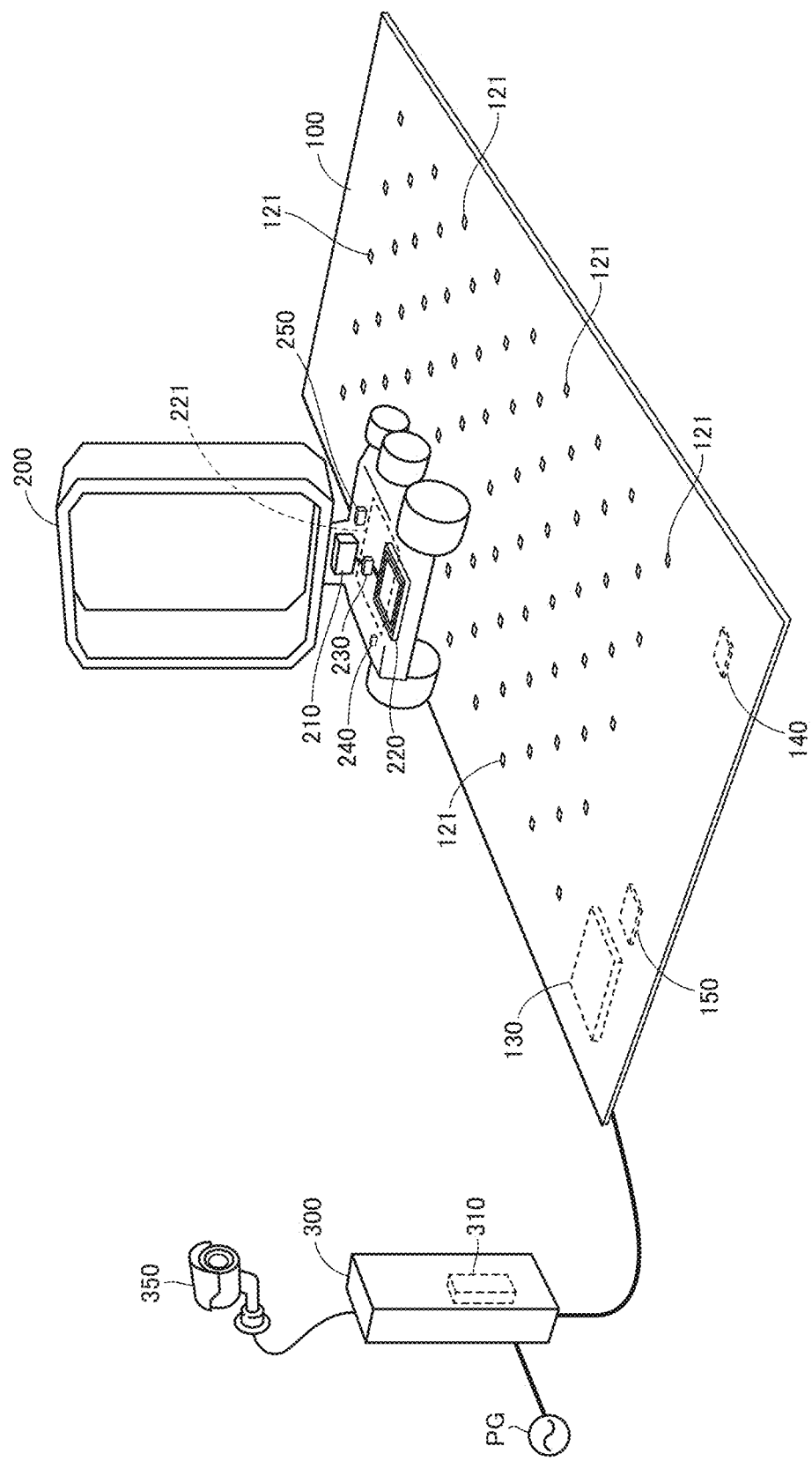
FIG. 3 is a diagram for illustrating a configuration of a movable body and configurations of a power feed mat and a power supply facility thereof in a power feed system according to the first embodiment of the present disclosure.

FIG. 3 is a diagram for illustrating a configuration of a movable body fed with power from power feed mat 100 and a configuration of a power supply facility of power feed mat 100. A configuration of AGV 200 will be described below by way of example of the movable body.

Referring to FIG. 3 together with FIG. 2, the power feed system according to this embodiment includes power feed mat 100, a power supply module 300, and a camera 350. Power supply module 300 corresponds to the power supply facility of power feed mat 100. Power supply module 300 is electrically connected to power feed mat 100 through a cable. Power supply module 300 includes a power supply circuit 310. Power supply circuit 310 is configured to receive supply of electric power from a power grid PG and to supply electric power to each of the plurality of power transmission coils 120 included in power feed mat 100. Power grid PG is an electric power network constructed of a power plant and a power transmission and distribution facility that are not shown. Power grid PG supplies alternating-current (AC) power (for example, three-phase AC power) to power supply module 300. Power supply circuit 310 includes a power conversion circuit. Power supply circuit 310 converts electric power supplied from power grid PG into electric power suitable for power feed mat 100 and supplies resultant electric power to power feed mat 100.

Camera 350 is configured to receive supply of electric power from power supply module 300 and to pick up an image of an area around power feed mat 100 from above power feed mat 100. Power supply module 300 includes also a power supply circuit (not shown) for camera 350 in addition to power supply circuit 310 for power feed mat 100.

Camera 350 may be attached to a wall. Alternatively, a post on which camera 350 is supported may be provided. Camera 350 contains, in addition to an image pick-up element, a processor and an image processing circuit that analyze video images obtained by the image pick-up element. Camera 350 picks up an image of the entire surface of power feed mat 100 and identifies an object (a living body or a substance) present on power feed mat 100. Camera 350 monitors a state of power feed mat 100.

Power feed mat 100 further includes in the inside of sheet substrate 110 (FIG. 1), a plurality of magnetic markers 121, a power control circuit 130, a wireless communication instrument 140, and a mat controller 150 that controls power control circuit 130. A computer including a processor, a random access memory (RAM), a storage, and a communication interface (I/F) can be adopted as mat controller 150. In this embodiment, various types of control in power feed mat 100 are carried out by execution by the processor of a program stored in a storage in mat controller 150. Various types of control in power feed mat 100 are not limited to control carried out by software but can also be carried out by dedicated hardware (electronic circuitry).

Power control circuit 130 includes a connection switching circuit. This connection switching circuit is configured to receive supply of electric power from power supply circuit 310 and to switch between connection and disconnection between each power transmission coil 120 included in power feed mat 100 and power supply circuit 310. The connection switching circuit of power control circuit 130 may include a switch provided for each power transmission coil 120. In this embodiment, the connection switching circuit is a normally-off switching circuit. While mat controller 150 is in a non-operating state (including a sleep state), each power transmission coil 120 included in power feed mat 100 and power supply circuit 310 are disconnected from each other.

Power control circuit 130 further includes a power conversion circuit. This power conversion circuit is configured to apply a prescribed voltage to each power transmission coil 120 electrically connected to power supply circuit 310. Specifically, the power conversion circuit of power control circuit 130 may include a resonance circuit (for example, an LC resonance circuit), a filter circuit, an inverter, and a power factor correction (PFC) circuit. Though details will be described later, mat controller 150 controls power control circuit 130 to apply a voltage suitable for wireless power feed to power transmission coil 120 coupled to a power reception coil (secondary coil) and to apply a weak voltage to power transmission coil 120 not coupled to a power reception coil (secondary coil).

A plurality of magnetic markers 121 are provided in correspondence with the plurality of power transmission coils 120, respectively. In other words, magnetic marker 121 is provided for each power transmission coil 120 included in power feed mat 100. Magnetic marker 121 indicates a position of corresponding power transmission coil 120. By detecting magnetism emitted from magnetic marker 121 with a magnetic sensor, the movable body can detect the position of power transmission coil 120 corresponding to magnetic marker 121.

In the inside of a cable through which power feed mat 100 and power supply module 300 are connected to each other, not only a power line but also a communication line is provided. In this embodiment, power feed mat 100 and power supply module 300 are configured to communicate with each other. Mat controller 150 is configured to control power supply circuit 310 in power supply module 300. Camera 350 is communicatively connected to power feed mat 100 with power supply module 300 being interposed. Information obtained by camera 350 is provided to mat controller 150 through power supply module 300.

AGV 200 includes a battery 210, a power reception coil 220 that wirelessly receives electric power from power transmission coil 120, a charging circuit 230 that charges battery 210 with electric power received by power reception coil 220, a wireless communication instrument 240, and an electronic control unit (ECU) 250 that controls charging circuit 230.

A known power storage for a vehicle (for example, a liquid secondary battery, an all-solid secondary battery, or a battery assembly) can be adopted as battery 210. Examples of the secondary battery for the vehicle include a lithium ion battery and a nickel metal hydride battery. Instead of the secondary battery, another power storage such as an electric double layer capacitor may be adopted. Charging circuit 230 functions as a vehicle-mounted charger of battery 210. A computer including a processor, a RAM, a storage, and a communication I/F can be adopted as ECU 250. In this embodiment, various types of control in AGV 200 are carried out by execution by the processor of a program stored in the storage in ECU 250. Various types of control in AGV 200 are not limited to control carried out by software but can also be carried out by dedicated hardware (electronic circuitry).

AGV 200 is an autonomous vehicle configured to travel with electric power stored in battery 210 without human intervention. Though not shown, AGV 200 further includes an electric motor, a battery management system (BMS), an autonomous driving sensor, and a navigation system including map information. AGV 200 travels with motive power generated by the electric motor by supply of electric power to the electric motor from battery 210. The BMS includes various sensors that detect a state (for example, a current, a voltage, and a temperature) of battery 210 and a result of detection is provided to ECU 250. For example, the BMS detects charging power (a charging current and a charging voltage) of battery 210. The BMS estimates a state of charge (SOC) of battery 210 and a result of estimation is provided to ECU 250.

The autonomous driving sensor is a sensor used for autonomous driving. The autonomous driving sensor, however, may be used for prescribed control while autonomous driving is not being carried out. The autonomous driving sensor includes a sensor that obtains information for recognizing an environment outside AGV 200 and a sensor that obtains information on a position and an attitude of AGV 200. The autonomous driving sensor includes at least one of a camera, a millimeter wave radar, and a lidar. The autonomous driving sensor further includes an inertial measurement unit (IMU) and a global positioning system (GPS) sensor.

AGV 200 is configured to autonomously travel in accordance with a prescribed travel schedule without human intervention. The travel schedule includes, for example, time of departure for a destination and time of arrival at the destination. The travel schedule may be set with any method. For example, a user may operate a user terminal (for example, a mobile terminal) capable of wirelessly communicating with AGV 200 to set a travel schedule and a destination in ECU 250. Alternatively, the user may operate a service tool connected to establish wired communication with AGV 200 or a human machine interface (HMI) of AGV 200 to set a travel schedule and a destination in ECU 250.

ECU 250 is configured to carry out autonomous driving (including autonomous parking) in accordance with a prescribed autonomous driving program. ECU 250 controls an accelerator, a brake, and a steering apparatus (none of which is shown) of AGV 200 based on various types of information obtained by the autonomous driving sensor, to thereby carry out autonomous driving of AGV 200. The autonomous driving program may sequentially be updated by Over the Air (OTA).

Charging circuit 230 is located between battery 210 and power reception coil 220 and controlled by ECU 250. Charging circuit 230 includes a power conversion circuit. When battery 210 is charged with electric power supplied from power transmission coil 120 to power reception coil 220, ECU 250 controls charging circuit 230 such that appropriate electric power is provided from power reception coil 220 to battery 210. Charging circuit 230 converts AC power provided from power reception coil 220 into direct-current (DC) power and provides DC power to battery 210. Specifically, charging circuit 230 may include a resonance circuit (for example, an LC resonance circuit), a filter circuit, and a rectification circuit.

AGV 200 further includes a position sensor module 221 that detects a position of AGV 200 on the mat surface (the main surface of power feed mat 100). Position sensor module 221 is used for alignment between power transmission coil 120 (magnetic marker 121) and power reception coil 220. Position sensor module 221 is provided, for example, on a bottom surface of AGV 200. Position sensor module 221 includes a plurality of magnetic sensors. The plurality of magnetic sensors may be arranged in grids. Each magnetic sensor included in position sensor module 221 detects magnetism emitted from magnetic marker 121. AGV 200 is configured to travel over power feed mat 100 while it aligns power transmission coil 120 and power reception coil 220 with each other based on a result of detection by position sensor module 221.

In this embodiment, power feed mat 100 and AGV 200 are configured to communicate with each other. Mat controller 150 and ECU 250 may wirelessly communicate with each other through wireless communication instruments 140 and 240. Any communication method is applicable. Mat controller 150 and ECU 250 may be configured to establish short-range communication (for example, direct communication within an area around power feed mat 100) such as near field communication (NFC) or Bluetooth®. Alternatively, mat controller 150 and ECU 250 may be configured to wirelessly communicate with each other by using a wireless local area network (LAN). AGV 200 may include a radio frequency identification (RFID) apparatus. Then, mat controller 150 may be configured to receive a signal emitted from the RFID apparatus of AGV 200.

Though the configuration of AGV 200 is described above, each of movable bodies 206 to 208 shown in FIG. 2 also contains a configuration similar to the configuration shown in FIG. 3. The circuit configuration described above may be modified as necessary to perform similar functions.

In this embodiment, when no movable body is present within a prescribed area around power feed mat 100, mat controller 150 of power feed mat 100 is in a non-operating state (for example, in a sleep state). Then, when a first movable body enters the prescribed area, mat controller 150 is activated. For example, when camera 350 recognizes a movable body around power feed mat 100, the movable body may be determined as having entered the prescribed area. Alternatively, when wireless communication instrument 140 receives a signal emitted from the RFID apparatus of the movable body, the movable body may be determined as having entered the prescribed area. Alternatively, the power feed system may be configured to determine whether or not the movable body has entered the prescribed area based on a geofencing technology.

Figure 4:
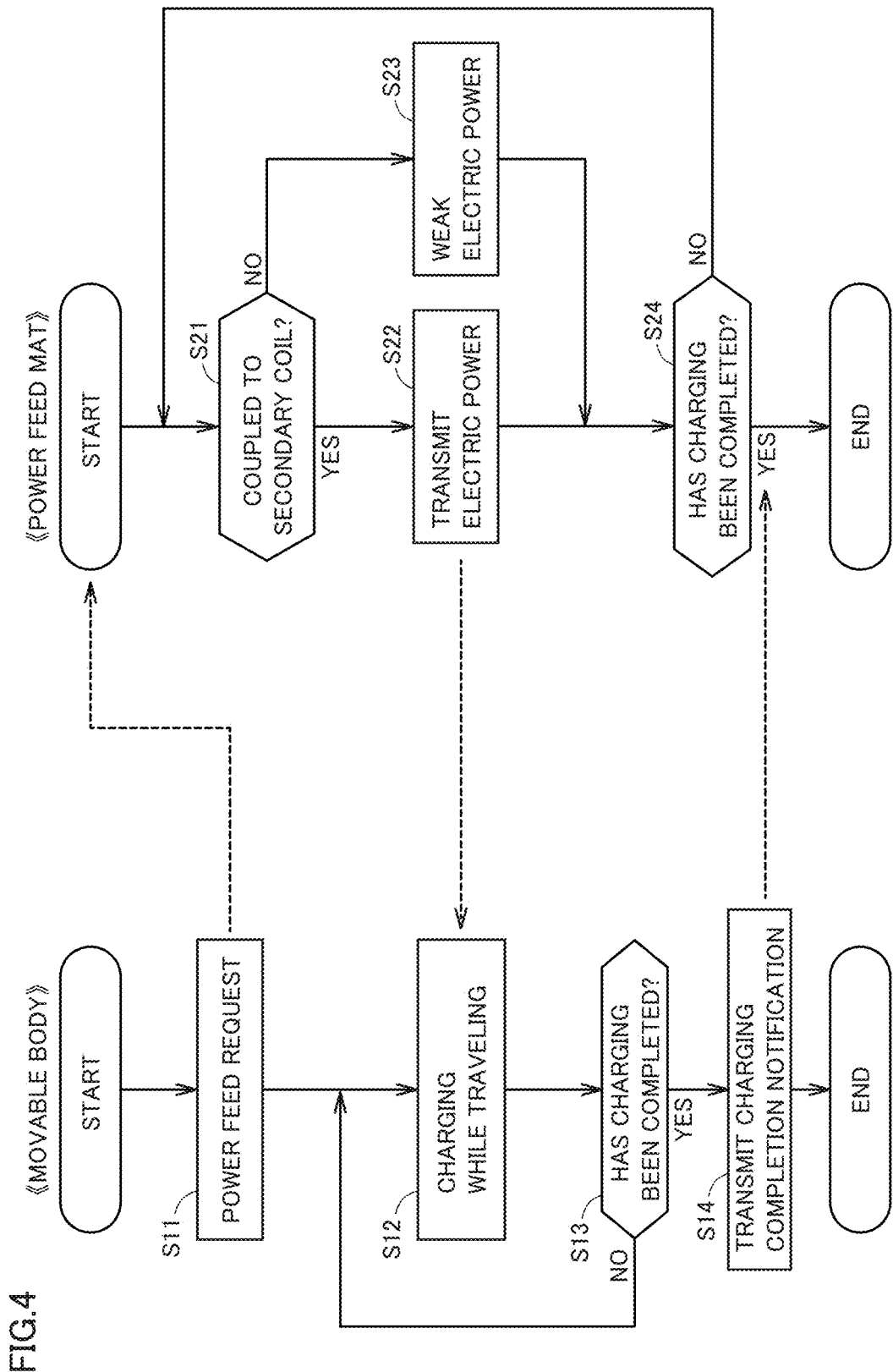
FIG. 4 is a flowchart showing a power feed method according to the first embodiment.

FIG. 4 is a flowchart showing a power feed method according to this embodiment. In this embodiment, when a prescribed charging start condition is satisfied, the movable body starts processing shown in FIG. 4. The prescribed charging start condition is satisfied, for example, when the movable body enters a prescribed area around power feed mat 100. Each step in the flowchart is simply denoted as "S" below. Though an example in which AGV 200 performs the processing shown in FIG. 4 is described below, another movable body (for example, movable bodies 206 to 208 shown in FIG. 2) also performs the processing shown in FIG. 4.

Referring to FIG. 4 together with FIG. 3, in SI 1, ECU 250 of AGV 200 transmits a power feed request (a signal requesting power feed) to power feed mat 100.

When power feed mat 100 receives the power feed request from AGV 200 (ECU 250), mat controller 150 starts processing shown in FIG. 4. In S11, information for authentication may be transmitted from the movable body to power feed mat 100. Then, mat controller 150 may start the processing shown in FIG. 4 only for the movable body that has successfully been authenticated.

In S21, mat controller 150 determines whether or not any power transmission coil 120 included in power feed mat 100 has electromagnetically been coupled to power reception coil 220 (secondary coil) of AGV 200. Mat controller 150 may determine whether or not power transmission coil 120 and power reception coil 220 have electromagnetically been coupled to each other based on a coefficient of coupling between power transmission coil 120 and power reception coil 220. Mat controller 150 may determine whether or not any power transmission coil 120 has electromagnetically been coupled to power reception coil 220 of AGV 200 while it has weak electric power supplied to each power transmission coil 120 included in power feed mat 100.

When there is a power transmission coil 120 (which is also referred to as a "coupled coil" below) in power feed mat 100 that is electromagnetically coupled to power reception coil 220, determination as YES is made in S21 and the process proceeds to S22. In S22, mat controller 150 controls power control circuit 130 such that wireless power transmission (WPT) from the coupled coil to power reception coil 220 is carried out. In S22, a voltage for wireless power feed is applied to the coupled coil. When camera 350 detects a prescribed object (for example, a foreign matter such as a metal piece) on power feed mat 100 (particularly, in the vicinity of the coupled coil), WPT (S22) may be prohibited When there is no coupled coil in power feed mat 100, determination as NO is made in S21 and the process proceeds to S23. In S23, mat controller 150 controls power control circuit 130 such that weak electric power is supplied to each power transmission coil 120 included in power feed mat 100.

Mat controller 150 continues processing in S21 to S23 described above until it receives a charging completion notification from AGV 200. In S24, mat controller 150 determines whether or not power feed mat 100 has received the charging completion notification.

In S12, AGV 200 carries out charging while traveling. Specifically, AGV 200 travels over power feed mat 100 while it aligns power transmission coil 120 and power reception coil 220 with each other based on a result of detection by position sensor module 221. AGV 200 is fed with power from power feed mat 100 while traveling. Then, battery 210 is charged with electric power supplied from power transmission coil 120 of power feed mat 100 to power reception coil 220 of AGV 200. Power transmission coil 210 that feeds power to AGV 200 that is traveling changes depending on the position of AGV 200. During charging of battery 210, ECU 250 controls charging circuit 230 to adjust charging power.

AGV 200 continues traveling and charging until a prescribed charging completion condition is satisfied. In S13, ECU 250 determines whether or not the charging completion condition has been satisfied. In this embodiment, the charging completion condition is satisfied when AGV 200 passes over power feed mat 100. When power reception coil 220 is no longer fed with power from power feed mat 100. ECU 250 may determine that AGV 200 has passed over power feed mat 100. When the SOC of battery 210 becomes equal to or larger than a prescribed SOC value (for example, an SOC value indicating full charge) as well, the charging completion condition is satisfied. When the charging completion condition is satisfied (YES in S13), in S14, ECU 250 transmits a charging completion notification to power feed mat 100. Then, when power feed mat 100 receives the charging completion notification (YES in S24), a series of processing shown in FIG. 4 ends.

Figure 5:
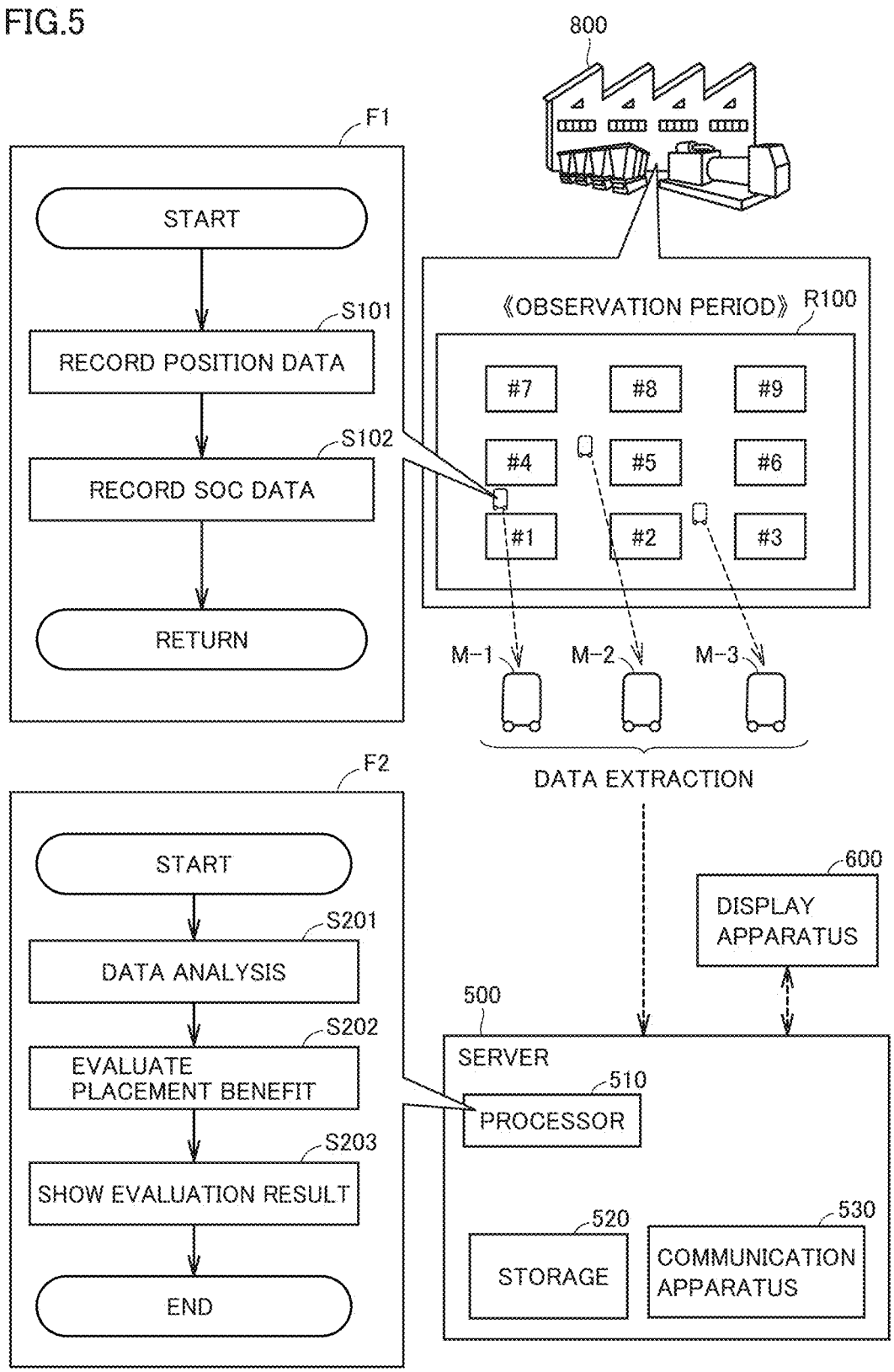
FIG. 5 is a diagram for illustrating a function of a computer (server) according to the first embodiment.

As described above, power feed mat 100 is configured to wirelessly feed power to a movable body (for example, any of movable bodies 201 to 208 shown in FIG. 2). Since power feed mat 100 is easily portable (see FIG. 1), a degree of freedom of placement of power feed mat 100 is high. Since there are many candidates for placement locations of power feed mat 100, it is not necessarily easy for a user to select a placement location of power feed mat 100. In order to facilitate placement of power feed mat 100 at an appropriate location, the power feed system according to this embodiment includes a server 500 which will be described below. FIG. 5 is a diagram for illustrating a function of server 500.

Referring to FIG. 5 together with FIG. 3, server 500 is configured to evaluate placement benefit (that is, benefit obtained when power feed mat 100 is placed) for each of a plurality of locations within a subject region where power feed mat 100 can be placed. Server 500 corresponds to an exemplary "computer" according to the present disclosure.

Server 500 includes a processor 510, a storage 520, and a communication apparatus 530. Processor 510 may be implemented by a central processing unit (CPU). Storage 520 is configured such that various types of information can be stored therein. Communication apparatus 530 includes various communication I/Fs. Server 500 is configured to communicate with the outside through communication apparatus 530.

Not only a program to be executed by processor 510 but also information (for example, a map, a mathematical expression, and various parameters) to be used by a program is stored in storage 520. As a program stored in storage 520 is executed by processor 510, various types of processing in server 500 are performed in this embodiment. Various types of processing in server 500 are not limited to processing performed by software but can also be performed by dedicated hardware (electronic circuitry).

The power feed system according to this embodiment further includes a display apparatus 600. Display apparatus 600 is configured to show information in accordance with an instruction from server 500. In this embodiment, a touch panel display is adopted as display apparatus 600. Display apparatus 600 accepts an input from a user. Then, when display apparatus 600 accepts an input from the user, it provides a signal corresponding to the input to server 500. In this embodiment, display apparatus 600 also serves as an input apparatus for input to server 500. Without being limited as such, an input apparatus may be provided separately from the display apparatus.

Server 500 belongs, for example, to a rental business operator who rents power feed mats 100. Server 500 is configured to evaluate the placement benefit for each location within a subject region, based on a result of observation (observation result) of a behavior of each movable body and a remaining amount of stored power of each movable body during a prescribed observation period for which a plurality of movable bodies are used in the subject region. The placement benefit is evaluated, for example, before power feed mat 100 is rented. In this embodiment, before the rental business operator rents power feed mat 100 to a factory 800, server 500 evaluates the placement benefit for each of a plurality of locations in a region R100 in factory 800. In this embodiment, region R100 in factory 800 corresponds to an exemplary "subject region" according to the present disclosure.

Figure 6:
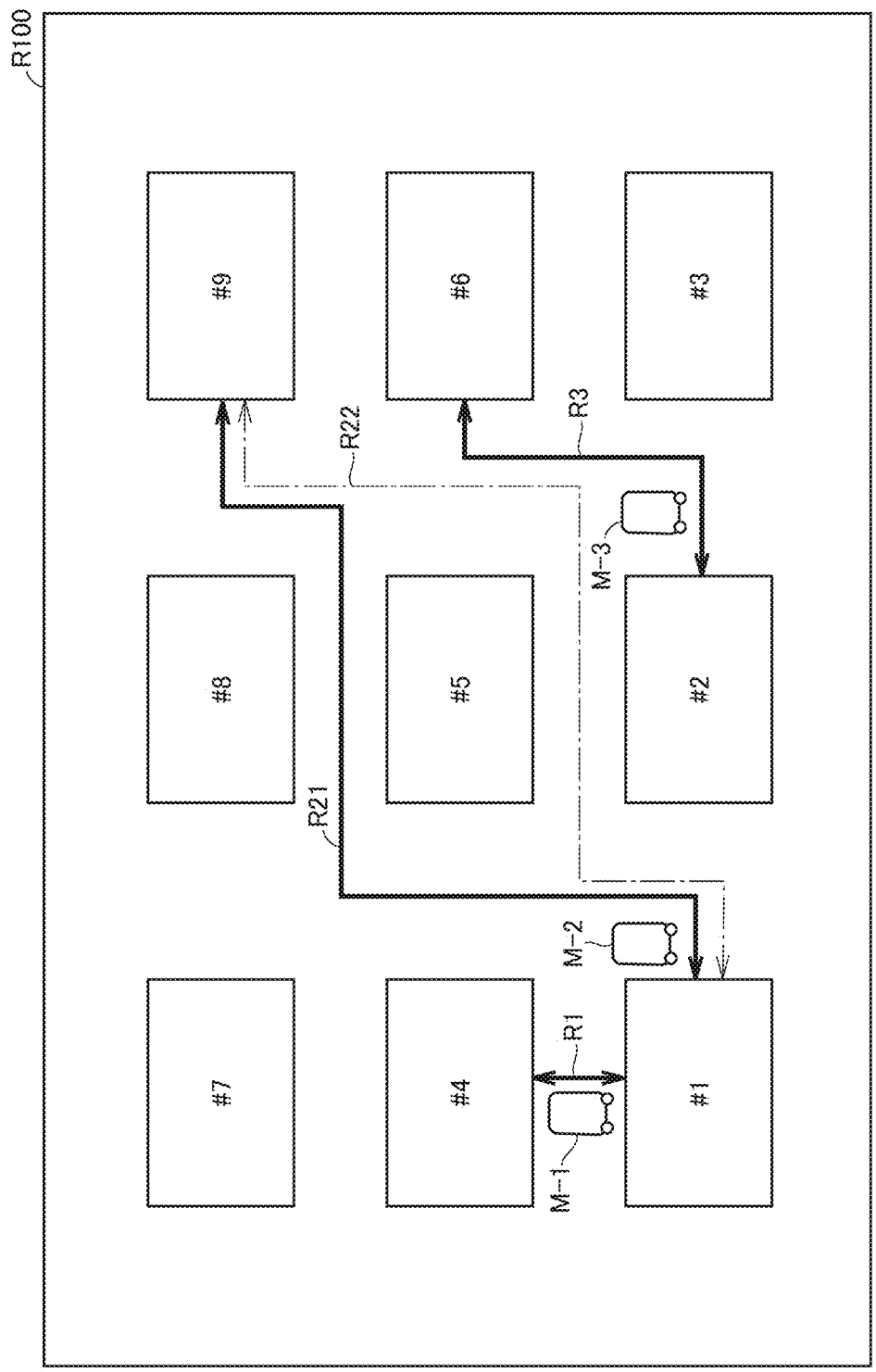
FIG. 6 is a diagram for illustrating an exemplary manner of use of a movable body in a factory shown in FIG. 5.

In factory 800, movable bodies M-1 to M-3 are used in region R100. Each of movable bodies M-1 to M-3 is, for example, an AGV configured similarly to AGV 200 shown in FIG. 3. FIG. 6 is a diagram for illustrating an exemplary manner of use of movable bodies M-1 to M-3 in factory 800.

Referring to FIG. 6, movable body M-1 moves between an area #1 and an area #4 to transport a load. Movable body M-1 moves back and forth between area #1 and area #4 along a route R1. Movable body M-2 moves between area #1 and an area #9 to transport a load. Movable body M-2 moves back and forth between area #1 and area #9 mainly along a route R21. When route R21 is congested, movable body M-2 moves between area #1 and area #9 along a route R22. Movable body M-3 moves between an area #2 and an area #6 to transport a load. Movable body M-3 moves back and forth between area #2 and area #6 along a route R3. Movable bodies M-1 to M-3 are thus used for transport of a load in operations of factory 800.

Referring again to FIG. 5, movable bodies M-1 to M-3 are used as above also during the observation period as in normal operations (see FIG. 6). During the observation period, a behavior and a remaining amount of stored power of each of movable bodies M-1 to M-3 that operate as usual in region R100 are measured and recorded. During the observation period, each of movable bodies M-1 to M-3 repeatedly performs processing shown in a flowchart F1 in prescribed cycles.

In flowchart F1, in S101, ECU 250 (FIG. 3) has a position of the movable body in region R100 recorded in a storage. For example, the autonomous driving sensor measures the position of the movable body. Position data obtained in S101 represents the behavior of the movable body. In S102, ECU 250 has the SOC of battery 210 (FIG. 3) recorded in the storage. For example, the BMS measures the SOC of battery 210. SOC data obtained in S102 represents a remaining amount of stored power of the movable body.

After the observation period elapses, server 500 extracts data (the observation result during the observation period) recorded in the processing (flowchart F1) from each of movable bodies M-1 to M-3. Server 500 may obtain the data from each of movable bodies M-1 to M-3 through communication (wireless communication or wired communication) with each of movable bodies M-1 to M-3. The data may be sent from each of movable bodies M-1 to M-3 through a prescribed storage medium (or a service tool) to server 500.

Server 500 evaluates placement benefit for each of the plurality of locations within region R100 in processing shown in a flowchart F2. Processing shown in flowchart F2 may be started in response to an instruction from a user or may automatically be started when server 500 obtains data necessary for evaluation.

In S201, processor 510 analyzes the observation result (that is, position data and SOC data obtained from each of movable bodies M-1 to M-3) during the observation period, and in S202, processor 510 evaluates placement benefit for each location within region R100 based on a result of analysis. Then, in S203, processor 510 has display apparatus 600 show a result of evaluation of the placement benefit.

An evaluation method and an evaluation result will be described below with reference to FIGS. 7 to 9. Each figure shows a result of evaluation of the placement benefit with A to E. The result of evaluation of the placement benefit is higher in the order of A, B, C, D, and E.

Figure 7:
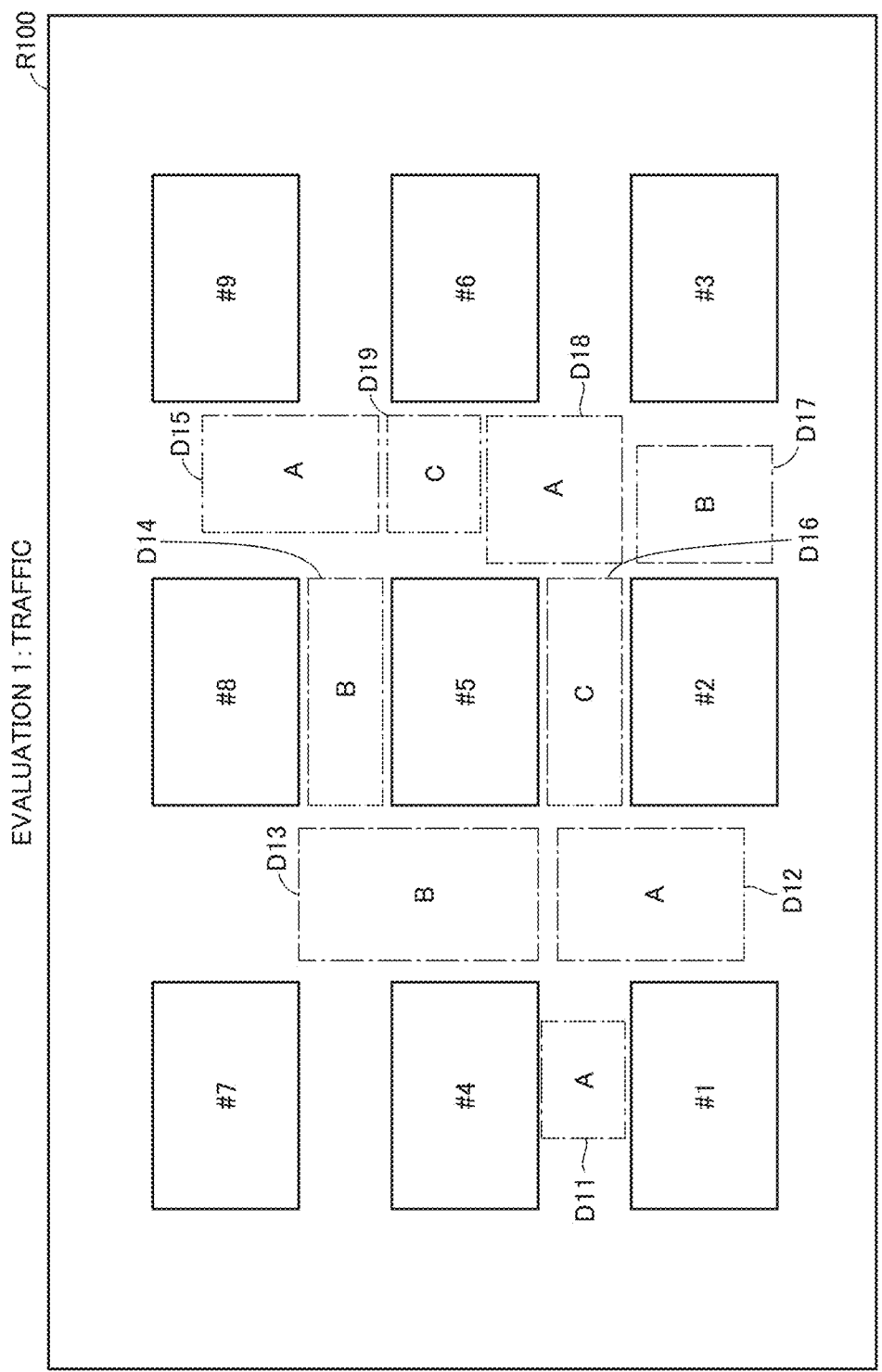
FIG. 7 is a diagram showing a first exemplary result of evaluation of placement benefit.

FIG. 7 is a diagram showing a first exemplary result of evaluation of placement benefit. Referring to FIG. 7 together with FIGS. 5 and 6, in this example, the placement benefit was evaluated with traffic of the movable body being used as an index. Server 500 found the traffic (a frequency of passage) of the movable body based on the behavior of the movable body, in particular, transition of the position of the movable body, during the observation period measured in S101 in flowchart F1 shown in FIG. 5. Server 500 evaluated a location where the traffic of the movable body was heavier during the observation period as being greater in benefit obtained when power feed mat 100 was placed. Specifically, each of locations D11, D12, D15, and D18 among locations D11 to D19 was evaluated as "A". Since movable body M-1 frequently passes over location D11 along route R1 (see FIG. 6), the location was evaluated as "A". Since movable body M-2 passes over each of locations D12 and D15 along both of routes R21 and R22 (see FIG. 6), the locations were evaluated as "A". Since movable body M-3 passes over location D18 along route R3 and movable body M-2 passes over location D18 along route R22 (see FIG. 6), the location was evaluated as "A".

Figure 8:
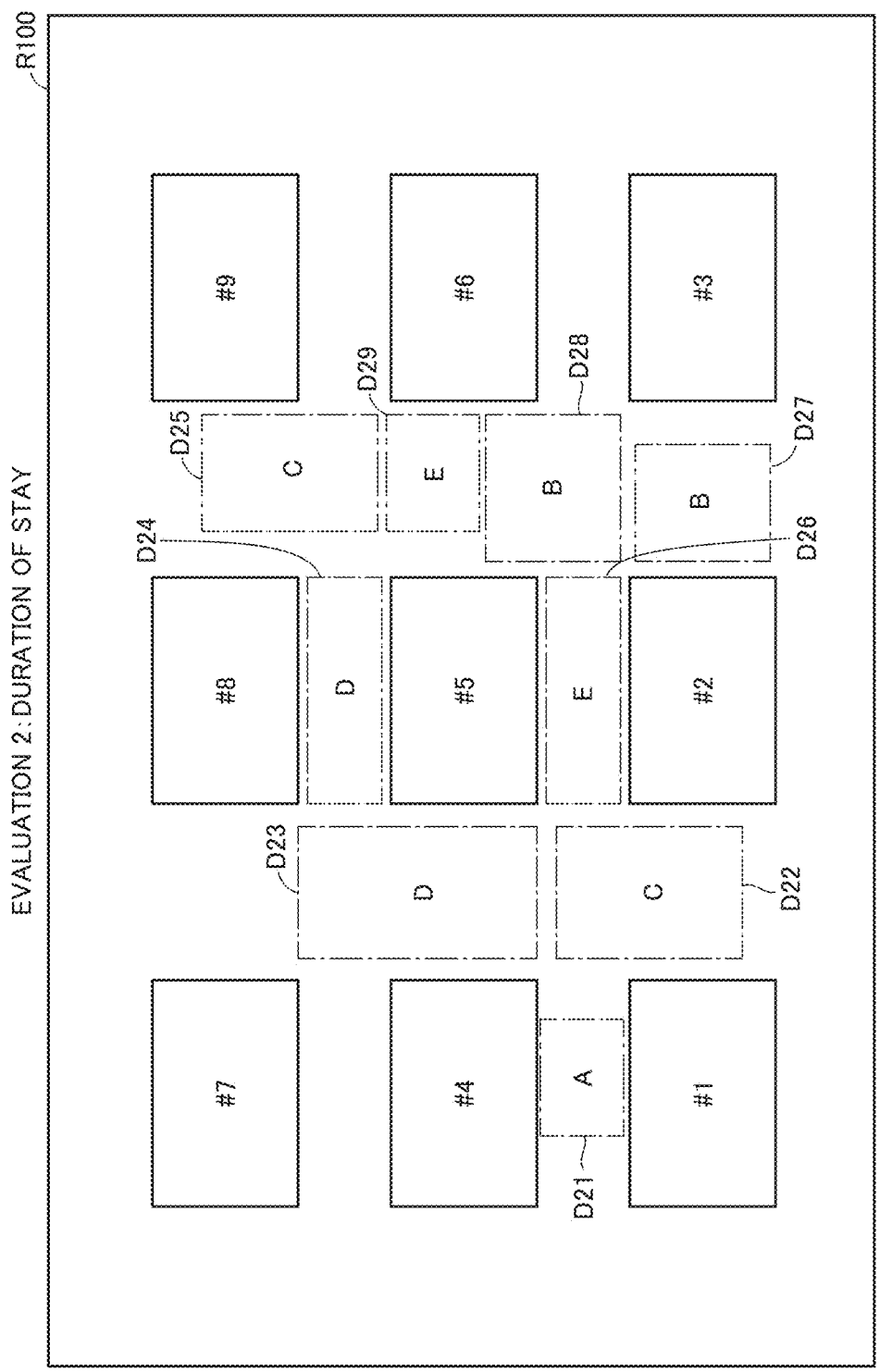
FIG. 8 is a diagram showing a second exemplary result of evaluation of placement benefit.

FIG. 8 is a diagram showing a second exemplary result of evaluation of placement benefit. Referring to FIG. 8 together with FIGS. 5 and 6, in this example, the placement benefit was evaluated with a duration of stay of the movable body being used as an index. Server 500 found the duration of stay of the movable body for each location based on the behavior of the movable body during the observation period measured in S101 in flowchart F1 shown in FIG. 5. Server 500 evaluated a location where the duration of stay of the movable body was longer during the observation period as being greater in benefit obtained when power feed mat 100 was placed. Specifically, a location D21 among locations D21 to D29 was evaluated as "A". Evaluation in the vicinity of areas #1, #2, #4, #6, and #9 where a load was delivered was relatively high.

Figure 9:
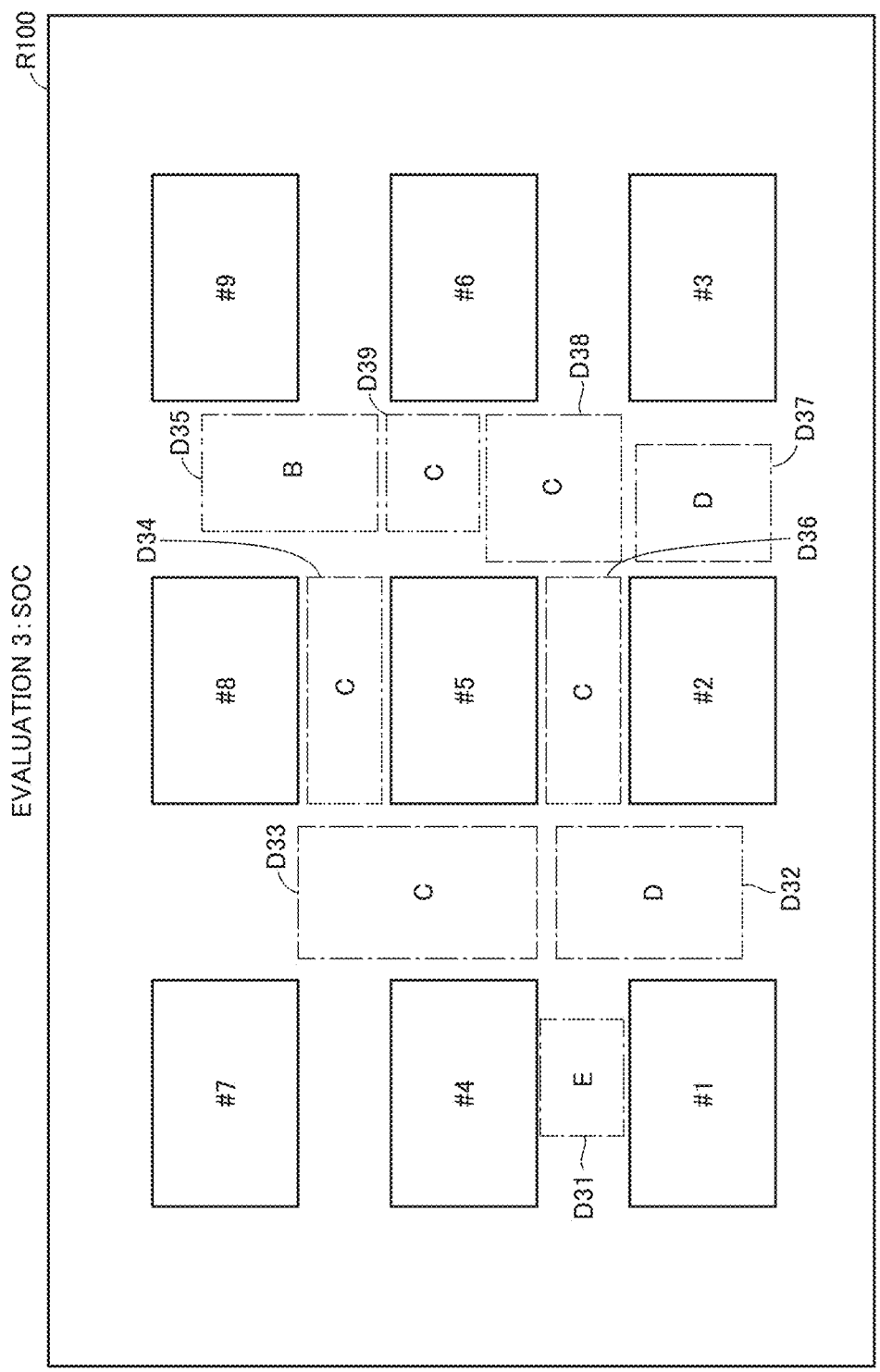
FIG. 9 is a diagram showing a third exemplary result of evaluation of placement benefit.

FIG. 9 is a diagram showing a third exemplary result of evaluation of placement benefit. Referring to FIG. 9 together with FIGS. 5 and 6, in this example, the placement benefit was evaluated with a remaining amount of stored power of the movable body being used as an index. Server 500 found the remaining amount of stored power (the SOC of battery 210) of the movable body for each location based on transition of the remaining amount of stored power of the movable body during the observation period measured in S102 in flowchart F1 shown in FIG. 5. Server 500 evaluated a location where the remaining amount of stored power of the movable body had become smaller during the observation period as being greater in benefit obtained when power feed mat 100 was placed. Specifically, a location D35 among locations D31 to D39 was evaluated as "B". Since a travel distance of the movable body was short along route R1 (see FIG. 6), evaluation of location D31 was low.

Server 500 may have display apparatus 600 individually show a plurality of evaluation results (for example, evaluation results shown in FIGS. 7 to 9) different in index, in response to an instruction from the user. A factory manager (a manager of factory 800) may check all evaluation results and then determine the placement location of power feed mat 100. The rental business operator that rents power feed mats 100 may load power feed mats 100 into factory 800 in response to a request from the factory manager and place power feed mat 100 at a location determined by the factory manager by consulting the evaluation result (that is, the placement benefit for each location within subject region R100).

As described above, server 500 evaluates placement benefit for each of a plurality of evaluation targets (for example, locations D11 to D19 shown in FIG. 7) within subject region R100. The user can consult the placement benefit evaluated by server 500 in selecting a placement location of power feed mat 100. Therefore, server 500 can facilitate selection of the placement location of power feed mat 100. Placement of power feed mat 100 by the user at an appropriate location is facilitated.

The power feed method according to the first embodiment includes the processing shown in FIG. 5. In S202 in FIG. 5, server 500 evaluates the benefit obtained when power feed mat 100 is placed, for each of a plurality of locations within the subject region where power feed mat 100 can be placed, power feed mat 100 being configured to wirelessly feed power to a movable body. In S203 in FIG. 5, display apparatus 600 shows the result of evaluation of the benefit for each location within the subject region. According to such a power feed method, placement of power feed mat 100 by the user at an appropriate location is facilitated.

The index for evaluating the placement benefit of power feed mat 100 is not limited to the traffic, the duration of stay, and the remaining amount of stored power of the movable body described above. For example, the placement benefit of power feed mat 100 may be evaluated with a density of people being used as the index. For example, behaviors of people may be observed with at least one camera (not shown) placed in region R100 within factory 800 during the observation period. Server 500 may find the density of people for each location within region R100 based on the behaviors of people during the observation period measured with at least one camera.

Figure 10:
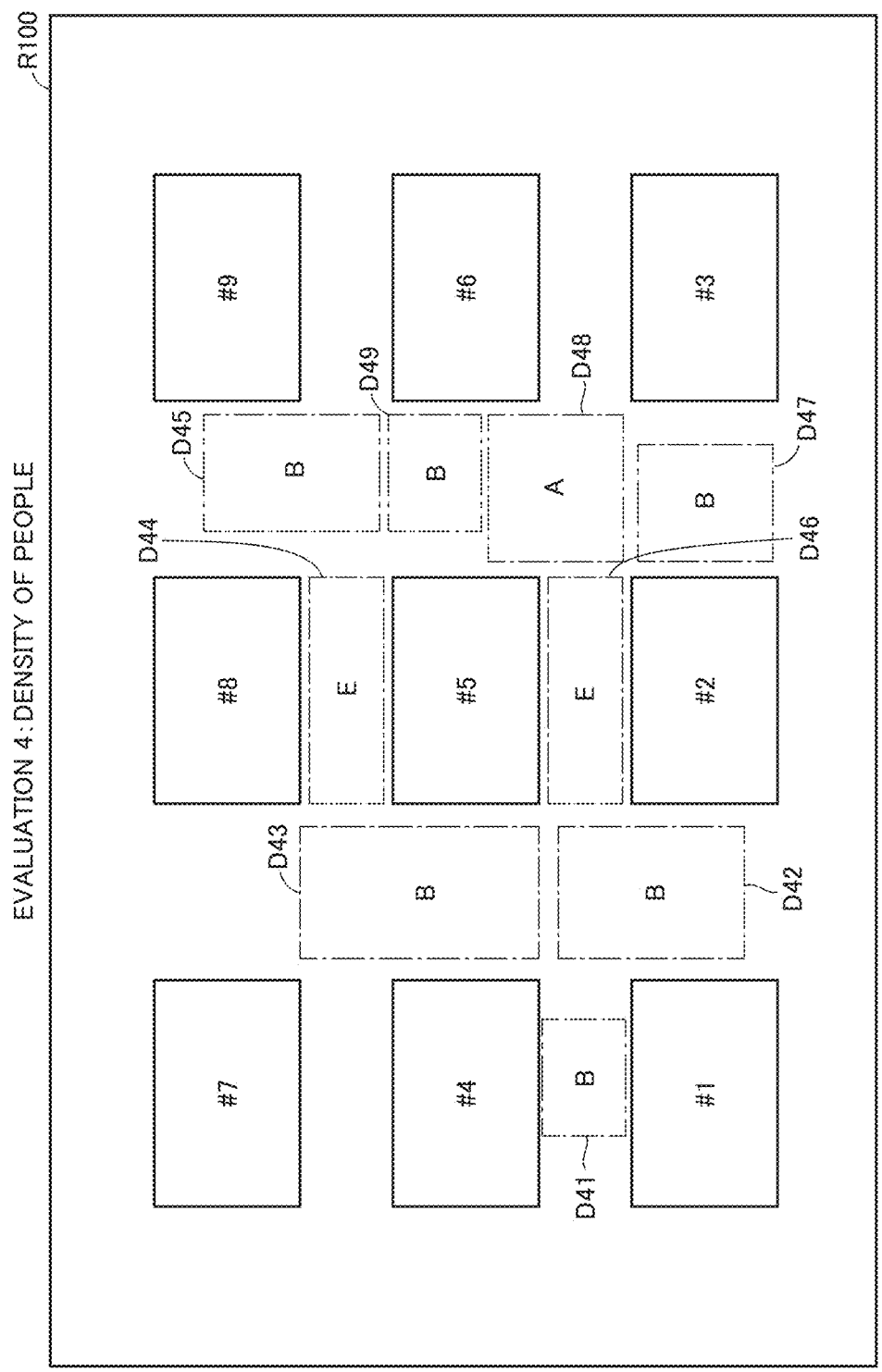
FIG. 10 is a diagram showing a fourth exemplary result of evaluation of placement benefit.

FIG. 10 is a diagram showing a fourth exemplary result of evaluation of placement benefit. Referring to FIG. 10 together with FIGS. 5 and 6, in this example, the placement benefit was evaluated with the density of people being used as the index. Server 500 evaluated the location lower in density of people during the observation period as being greater in benefit obtained when power feed mat 100 was placed. Specifically, locations D44 and D46 among locations D41 to D49 were high in density of people during the observation period and evaluated as "E".

The factory manager may check the evaluation result above and exclude a location high in density of people (for example, locations D44 and D46 shown in FIG. 10) from candidates for the placement location of power feed mat 100.

Server 500 may comprehensively evaluate the placement benefit with all of the traffic, the duration of stay, and the remaining amount of stored power of the movable body as well as the density of people described above being used as the indices and have display apparatus 600 show a comprehensive evaluation result.

Second Embodiment

The power feed system according to a second embodiment of the present disclosure will be described. Since the second embodiment is common to the first embodiment in many points, a difference will mainly be described and description of features in common is not provided.

Figure 11:
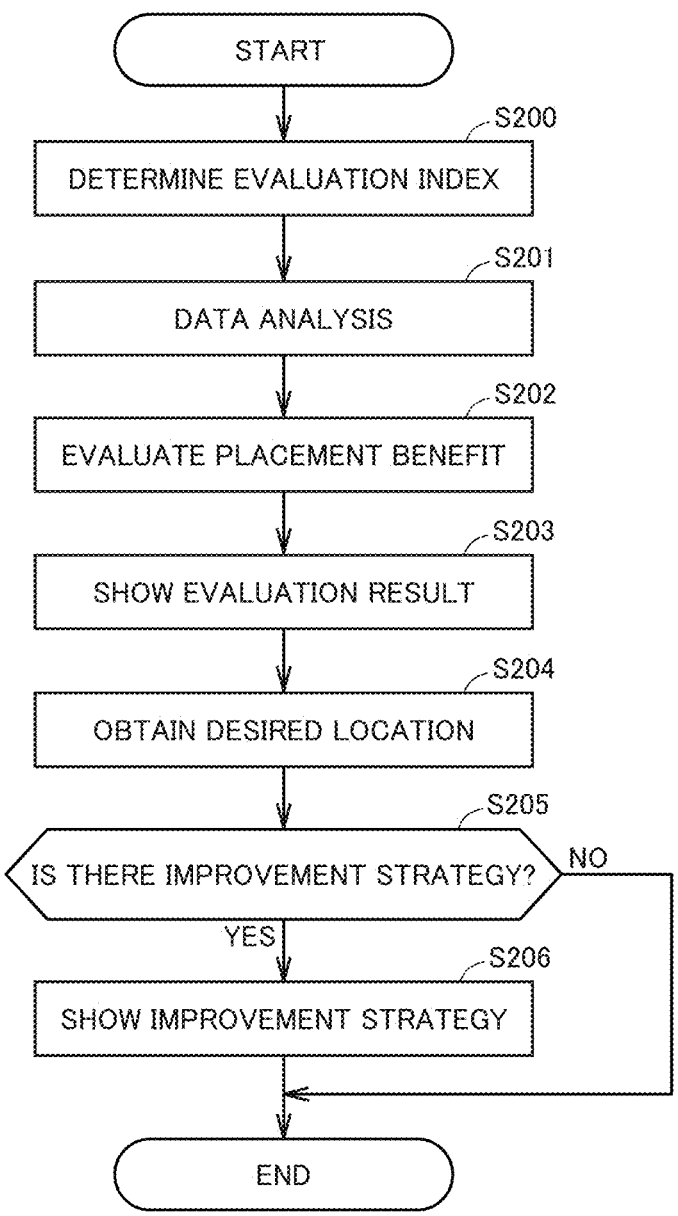
FIG. 11 is a flowchart showing processing involved with evaluation of the placement benefit performed by the computer (server) according to a second embodiment of the present disclosure.

Server 500 according to the second embodiment is configured to propose an improvement strategy for increasing the benefit obtained when power feed mat 100 is placed at a placement location desired by a user. FIG. 11 is a flowchart showing processing involved with evaluation of the placement benefit performed by server 500 according to the second embodiment. Server 500 performs processing shown in FIG. 11 instead of the processing involved with flowchart F2 shown in FIG. 5.

Referring to FIG. 11, in S200, server 500 (FIG. 5) determines an evaluation index. For example, server 500 requests a client (for example, a factory manager) to select the evaluation index from among a prescribed options. The options of the evaluation index include, for example, the traffic, the duration of stay, and the remaining amount of stored power of the movable body, as well as the density of people. Then, server 500 sets the index selected by the client as the evaluation index. An example in which the client selects the remaining amount of stored power of the movable body will be described below. The client may desire not to charge the power storage until the remaining amount of stored power of the movable body becomes small in order to extend an operating time period of the movable body or to suppress deterioration of the power storage.

In S201 and S202, the placement benefit is evaluated based on the index set in S200. Thereafter, in S203, the result (for example, see FIG. 9) of evaluation of the placement benefit is shown. In S201 to S203 in FIG. 11, processing similar to S201 to S203 in FIG. 5 is performed.

In S204, server 500 obtains the placement location of power feed mat 100 that is desired by the user (which is also referred to as a "desired location" below). For example, server 500 requests the client to select a desired location from among prescribed options. The options of the placement location of power feed mat 100 are, for example, locations D31 to D39 shown in FIG. 9. An example in which the client selects location D36 will be described below.

In S205, server 500 sequentially simulates how the placement benefit of location D36 varies with a condition affecting the placement benefit of location D36 being varied, based on the observation result (that is, position data and SOC data obtained from each of movable bodies M-1 to M-3) during the observation period, and determines whether or not there is a condition (improvement strategy) under which the placement benefit of location D36 becomes greater.

When it is determined that there is no improvement strategy for increasing the placement benefit of location D36 (NO in S205), a series of processing shown in FIG. 11 ends. On the other hand, when it is determined that there is an improvement strategy for increasing the placement benefit of location D36 (YES in S205), in S206, server 500 has display apparatus 600 (FIG. 5) show the improvement strategy for increasing the placement benefit of location D36 and an effect thereof.

Figure 12:
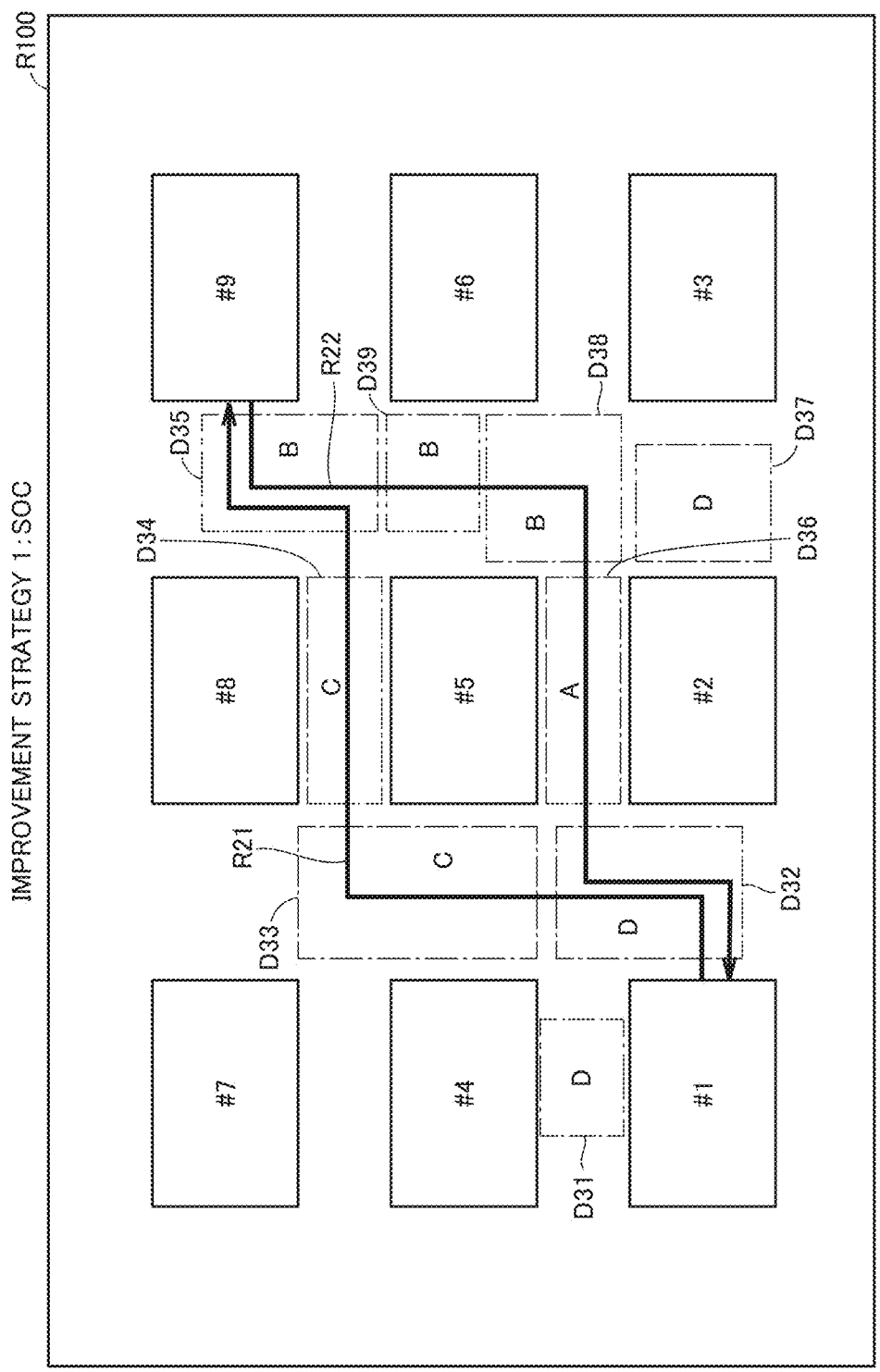
FIG. 12 is a diagram showing a first example of an improvement strategy for increasing the placement benefit and an effect thereof in the second embodiment.

FIG. 12 is a diagram showing a first example of an improvement strategy for increasing the placement benefit and an effect thereof. Referring to FIG. 12, in this example, server 500 proposes modification to travel control of movable body M-2 as the improvement strategy. Specifically, travel control of movable body M-2 is modified such that movable body M-2 travels along route R21 when it moves from area #1 to area #9 and travels along route R22 when it returns from area #9 to area #1. The simulation (S205 in FIG. 11) described previously shows that, by thus modifying travel control of movable body M-2, the placement benefit of location D36 improves from "C" (see FIG. 9) to "A". Furthermore, server 500 may propose slower travel of movable body M-2 at location D36 in order to increase an amount of charging power in one charging.

When the client accepts the improvement strategy, travel control of movable body M-2 may be modified by rewriting an autonomous driving program of movable body M-2. Server 500 may rewrite the autonomous driving program of movable body M-2 through communication (wireless communication or wired communication) with movable body M-2. Alternatively, the autonomous driving program may be installed into movable body M-2 through a prescribed storage medium (or a service tool) from server 500. Alternatively, the client rather than server 500 may rewrite the autonomous driving program of movable body M-2.

In the power feed system according to the second embodiment, server 500 is configured to propose an improvement strategy for increasing the benefit obtained when power feed mat 100 is placed at the placement location desired by the user, based on the observation result during the observation period. When there is a location where the user desires to place the power feed mat, the evaluation computer makes evaluation described previously and thereafter proposes an improvement strategy for increasing the placement benefit of the placement location desired by the user. Therefore, placement of the power feed mat by the user at a location great in placement benefit is facilitated. According to the configuration, effective use of the power feed mat by the user is facilitated.

Figure 13:
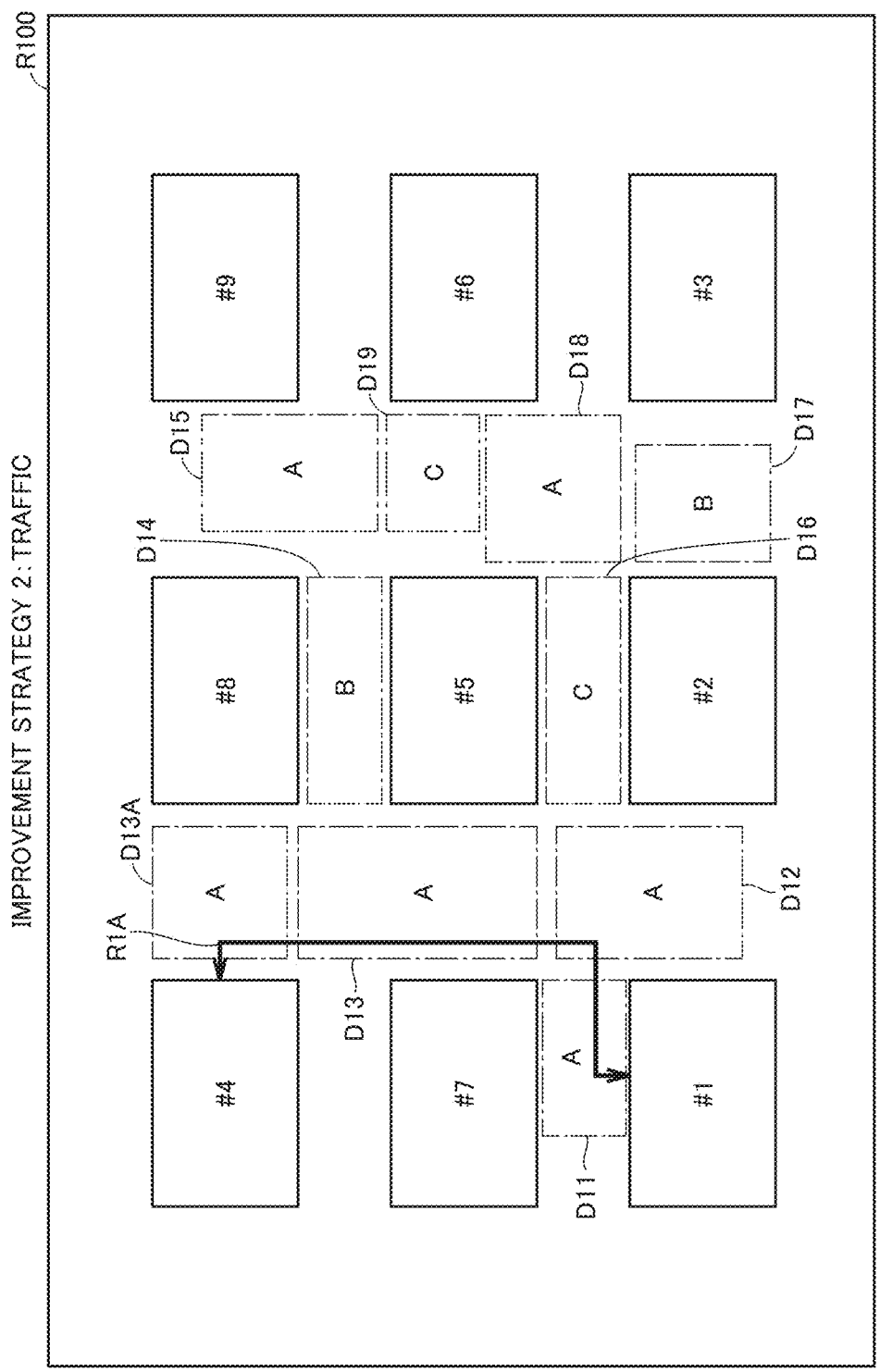
FIG. 13 is a diagram showing a second example of an improvement strategy for increasing the placement benefit and an effect thereof in the second embodiment.

In S200 in FIG. 11, an evaluation index other than the remaining amount of stored power of the movable body may be selected. An example in which the client selects the traffic of the movable body in S200 in FIG. 11 and the client selects location D13 (FIG. 7) in S204 in FIG. 11 will be described. FIG. 13 is a diagram showing a second example of an improvement strategy for increasing the placement benefit and an effect thereof.

Referring to FIG. 13, in this example, server 50) proposes as the improvement strategy, interchange between area #4 and an area #7 and modification to travel control of movable body M-1. Travel control of movable body M-1 is modified such that movable body M-1 moves back and forth between area #1 and area #4 (the position where area #7 had been present before improvement) along a route RIA. The simulation (S205 in FIG. 11) described above shows that, by thus modifying the layout within subject region R100 and travel control of movable body M-1, the placement benefit of location D13 improves from "B" (see FIG. 7) to "A". Furthermore, the placement benefit of a location D13A close to area #4 is also evaluated as "A".

A trained model obtained by machine learning using artificial intelligence (AI) may be used in the simulation (S205 in FIG. 11). The trained model may be a model trained to provide output of an improvement strategy (for example, the layout within region R100 or a manner of control of the movable body) with which the placement benefit of the desired location will be higher than the evaluation result in response to an input of the observation result (see FIG. 5) during the observation period, the evaluation result (S202 in FIG. 11), and the desired location (S204 in FIG. 11). Big data of cumulative observation results may be used for training the model.

Other Embodiments

Figure 14:
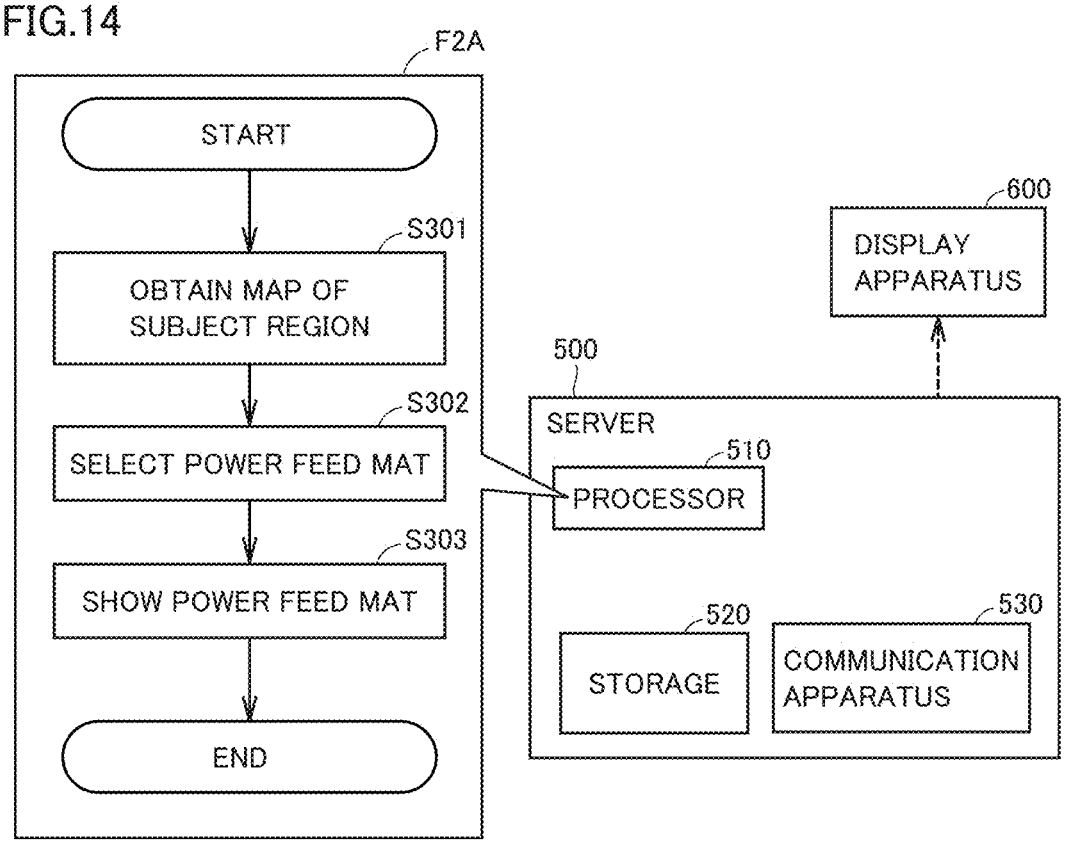
FIG. 14 is a diagram showing a modification of processing performed by the computer shown in FIG. 5.

Server 500 may be configured to evaluate the benefit obtained when the power feed mat is placed as being greater, as the power feed mat is less likely to deteriorate. Server 500 may be configured to select a power feed mat greatest in placement benefit from among options including a plurality of types of power feed mats for each location within the subject region. Server 500 may perform processing involved with a flowchart F2A shown in FIG. 14 instead of the processing involved with flowchart F2 shown in FIG. 5. FIG. 14 is a diagram showing a modification of flowchart F2 shown in FIG. 5.

Referring to FIG. 14, in S301, processor 510 obtains map information (map data) of the subject region. The map information may be information showing a floor map. Server 500 may obtain map information of the subject region from an external computer that manages the subject region. The user may enter map information of the subject region into server 500.

In following S302, processor 510 uses the map information of the subject region to select a power feed mat greatest in placement benefit (the power feed mat least likely to deteriorate) from among the options including the plurality of types of power feed mats, for each location within the subject region.

The options of the power feed mat include, for example, a standard mat, a waterproof mat, an up-and-down mat, and a wall-mounted mat. The standard mat is a power feed mat of a standard specification. For example, power feed mat 100 shown in FIG. 1 falls under the standard mat. The waterproof mat is a waterproof power feed mat. For example, a power feed mat subjected to waterproof treatment such as waterproof coating onto a surface of the power feed mat of the standard specification falls under the waterproof mat.

Figure 15:
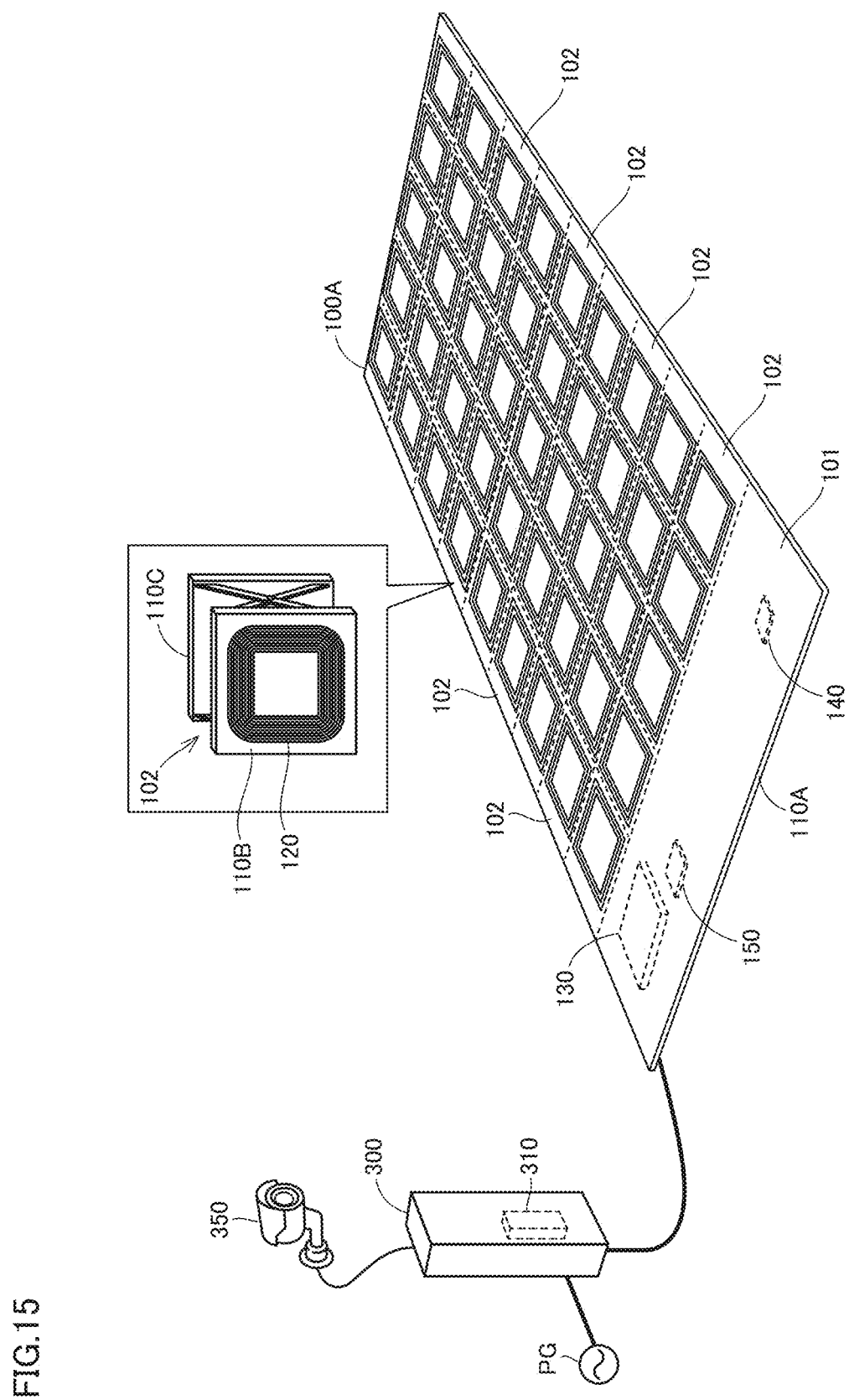
FIG. 15 is a diagram showing an exemplary up-and-down mat.

The up-and-down mat is a power feed mat including a hoisting-and-lowering mechanism. FIG. 15 is a diagram showing an exemplary up-and-down mat. Referring to FIG. 15, an up-and-down mat 100A is formed like a sheet by combination of one first plate member 101 with a plurality of second plate members 102.

First plate member 101 is electrically connected to power supply module 300 through a cable. First plate member 101 includes a sheet substrate 110A. Power control circuit 130, wireless communication instrument 140, and mat controller 150 are contained in sheet substrate 110A.

Each of the plurality of second plate members 102 includes a sheet substrate 110B, a hoisting-and-lowering mechanism 110C, and power transmission coil 120. Power transmission coil 120 is provided on a surface of sheet substrate 110B. Without being limited as such, power transmission coil 120 may be contained in sheet substrate 110B. Hoisting-and-lowering mechanism 110C is provided in sheet substrate 110B and configured to adjust the height of sheet substrate 110B. Hoisting-and-lowering mechanism 110C may be adjusted by a human. Hoisting-and-lowering mechanism 110C may be moved up and down in response to an instruction from mat controller 150.

Second plate member 102 includes a single power transmission coil 120. Without being limited as such, second plate member 102 may include at least two power transmission coils 120. Second plate member 102 may include a connector for connection to an electrical wire (an electrical wire leading to power transmission coil 120) of adjacent second plate member 102. Second plate member 102 may further include a locking mechanism that fixes a connected connector. Electric power supplied from power grid PG is supplied to each second plate member 102 through power supply module 300 and first plate member 101. Power supply circuit 310 included in power supply module 300 supplies electric power to power transmission coil 120 included in each second plate member 102.

By combining a plurality of second plate members 102 with single first plate member 101, up-and-down mat 100A that performs a function similarly to power feed mat 100 shown in FIG. 1 is formed. Up-and-down mat 100A can adjust the height for each second plate member 102. By changing the number of second plate members 102, a size of up-and-down mat 100A can be adjusted. Up-and-down mat 100A is constructed as being disassemblable. A plurality of second plate members 102 that form up-and-down mat 100A by being combined can return to individual small pieces (second plate members 102). Up-and-down mat 100A is constructed as being disassemblable into single first plate member 101 and a plurality of second plate members 102. Therefore, up-and-down mat 100A is easily carried. When at least one of the plurality of second plate members 102 that form up-and-down mat 100A fails or deteriorates, that second plate member 102 alone can be replaced.

Figure 16:
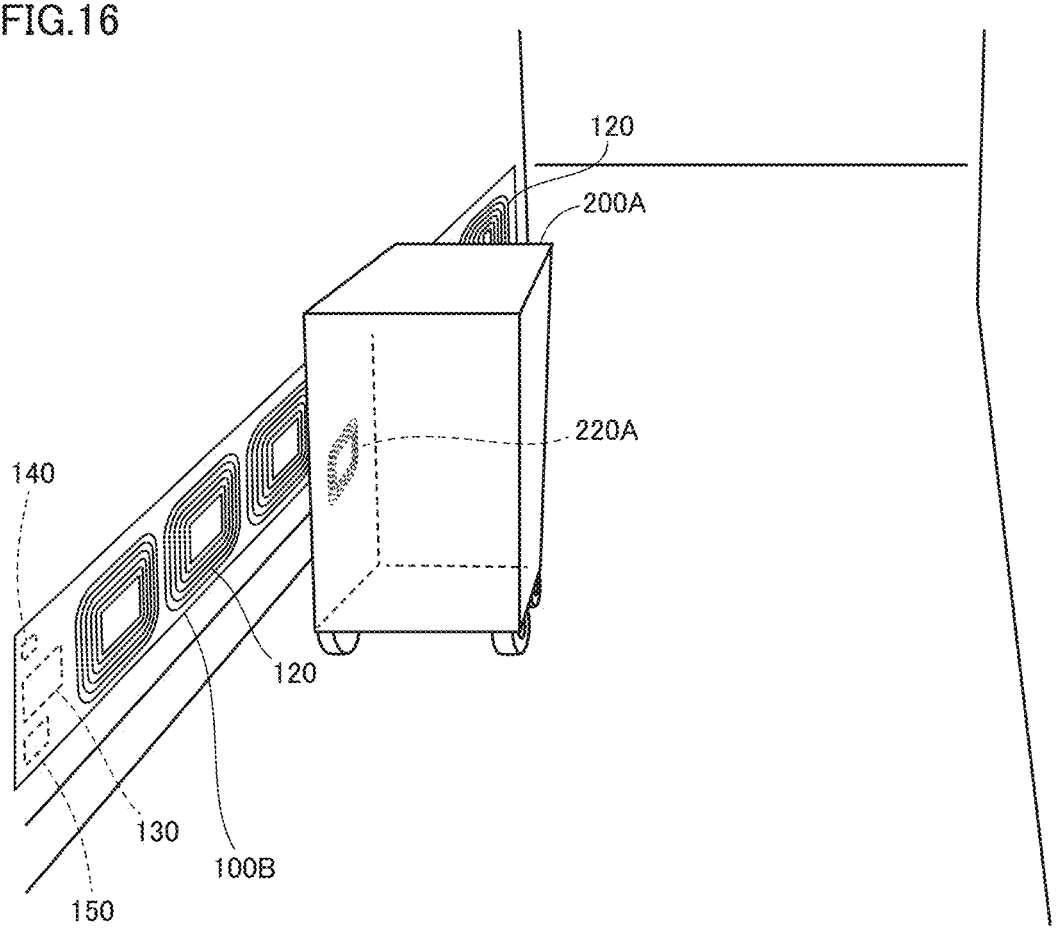
FIG. 16 is a diagram showing an exemplary wall-mounted mat.

The wall-mounted mat is a power feed mat that can be placed on a wall. FIG. 16 is a diagram showing an exemplary wall-mounted mat. Referring to FIG. 16, a wall-mounted mat 100B is placed, for example, on a wall indoors. The wall-mounted mat may be hung on the wall or bonded to the wall. Wall-mounted mat 100B includes a plurality of power transmission coils 120, power control circuit 130, wireless communication instrument 140, and mat controller 150. An AGV 200A is configured to use wall-mounted mat 100B. AGV 200A is basically similar in configuration to AGV 200 shown in FIG. 3. AGV 200A includes a power reception coil 220A provided in a side portion of a vehicle body in addition to power reception coil 220 (FIG. 3) provided under the vehicle body. Power reception coil 220A is configured to wirelessly receive electric power from power transmission coil 120 of wall-mounted mat 100B placed on the wall.

Referring again to FIG. 14, in this modification, the movable body used in the subject region is configured to be able to use all of the standard mat, the waterproof mat, the up-and-down mat, and the wall-mounted mat described above. In S302, for each location within the subject region, a power feed mat (more specifically, a power feed mat least likely to deteriorate) suitable for that location is selected. When a plurality of types of power feed mats are equal in less likeliness of deterioration, one type of power feed mat is selected in accordance with a prescribed priority. In this modification, the priority at the time w % ben less likeliness of deterioration is equal is higher in the order of the standard mat, the waterproof mat, the up-and-down mat, and the wall-mounted mat.

In following S303, processor 510 has display apparatus 600 show the power feed mat selected in S302 for each location within the subject region.

FIG. 17 is a diagram showing an exemplary power feed mat for each location within a subject region, that is shown in S303 shown in FIG. 14. Referring to FIG. 17, in this example, a region R200 corresponds to the subject region. Among locations D51 to D55 included in region R200, the waterproof mat is selected for location D51, the wall-mounted mat is selected for each of locations D52 and D54, the up-and-down mat is selected for location D53, and the standard mat is selected for location D55. Location D51 is a location outdoors. When the standard mat is placed outdoors, the standard mat is wetted with rain and is more likely to deteriorate. Therefore, the waterproof mat is selected for location D51. Locations D52 and D54 are narrow passages. In the narrow passage, people step on the power feed mat and the power feed mat is more likely to deteriorate. Therefore, the wall-mounted mat is selected for each of locations D52 and D54. Location D53 includes a height difference. The height difference interferes travel of the movable body. When the movable body gets over the height difference, shock tends to be applied to the power feed mat. Therefore, the up-and-down mat capable of lessening the height difference is selected for location D53. For location D55, less likeliness of deterioration is equal among the standard mat, the waterproof mat, the up-and-down mat, and the wall-mounted mat. Therefore, the standard mat highest in priority is selected.

The subject region is not limited to the inside of a factory but may be the inside of another business facility (for example, a school, a hospital, an inn, a bank, or a shopping center) or the inside of a house. The subject location may be a location outdoors Server 500 may be configured to evaluate placement benefit for each location within the subject region, based on traffic information (for example, information representing the traffic of the movable body and congestion) of the subject region outdoors. The placement benefit may be evaluated in an application other than rental of the power feed mat.

A movable body to which the power feed mat is applied is not limited to the vehicle shown in FIGS. 2 and 3. The movable body is not limited to the BEV without including an internal combustion engine but may be a plug-in hybrid electric vehicle (PHEV) including an internal combustion engine. It is not essential that the movable body is configured to autonomously drive without human intervention. The movable body may manually be driven by a human. The movable body may carry out charging while parking rather than charging while traveling. The movable body may be an agricultural machine, a walking robot, a drone, a robot cleaner, or a spacecraft, or a rail vehicle, a ship, or an airplane.

Various modifications may be carried out as freely being combined.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A power feed system comprising:
a plurality of movable bodies,
a power feed mat configured to wirelessly feed power to each of the plurality of movable bodies,
a display, and
a computer configured to
obtain location information measured during a prescribed period for which the plurality of movable bodies is used in a subject region where the power feed mat can be placed,
wherein the location information includes at least one of (i) a behavior of said each of the plurality of movable bodies, (ii) a remaining amount of stored power of said each of the plurality of movable bodies, and (iii) a density of people in the subject region,
evaluate, based on the location information, benefit obtained in response to the power feed mat being placed, for each of a plurality of locations within the subject region,
cause the display to display a result of evaluation of the benefit for said each of the plurality of locations within the subject region,
obtain, among the plurality of locations, a desired location being a placement location of the power feed mat desired by a user,
simulate how placement benefit obtained in response to the power feed mat being placed at the desired location varies with variations of conditions affecting the placement benefit,
determine whether or not there is improvement strategy indicating a condition among the conditions under which the placement benefit becomes greater based on the location information, and
in response to determining that there is the improvement strategy for increasing the placement benefit, cause the display to display the improvement strategy for increasing the placement benefit and an effect of the improvement strategy.

2. The power feed system according to claim 1, wherein the location information includes position data of said each of the plurality of movable bodies, and
the computer is configured to
obtain traffic of said each of the plurality of locations based on the position data, and
determine a location among the plurality of locations where the traffic is heavier during the prescribed period as having greater benefit obtained in response to the power feed mat being placed.

3. The power feed system according to claim 1, wherein the location information includes position data of said each of the plurality of movable bodies, and
the computer is configured to
obtain a duration of stay of a movable body of the plurality of movable bodies for said each of the plurality of locations based on the position data, and
determine a location among the plurality of locations where the duration of stay is longer during the prescribed period as having greater benefit obtained in response to the power feed mat being placed.

4. The power feed system according to claim 1, wherein the location information includes
first data that represents a position of said each of the plurality of movable bodies, and
second data that represents the remaining amount of stored power of said each of the plurality of movable bodies, and
the computer is configured to
obtain the remaining amount of stored power of a movable body of the plurality of movable bodies for each of the plurality of locations based on the first data and the second data, and determine a location among the plurality of locations where the remaining amount of stored power has become smaller during the prescribed period as having greater benefit obtained in response to the power feed mat being placed.

5. The power feed system according to claim 1, wherein the location information includes camera data that represents behaviors of people observed with at least one camera placed in the subject region, and
the computer is configured to
obtain the density of people for said each of the plurality of locations based on the camera data, and
determine a location among the plurality of locations where the density of people is lower during the prescribed period as having greater benefit obtained in response to the power feed mat being placed.

6. The power feed system according to claim 1, wherein said each of the plurality of movable bodies is configured to carry out autonomous driving, and
the computer is configured to, in response to a proposal of modification to travel control of a movable body of the plurality of movable bodies as the improvement strategy, rewrite an autonomous driving program of the movable body through communication with the movable body.

7. The power feed system according to claim 1, wherein the conditions affecting the placement benefit include a type of the power feed mat, and
the computer is configured to
select a power feed mat greatest in the placement benefit from among options including a plurality of types of power feed mats, for each location among the plurality of locations within the subject region, and
cause the display to display the selected power feed mat.

8. The power feed system according to claim 7, wherein the options include a standard mat, a waterproof mat, an up-and-down mat, and a wall-mounted mat,
the standard mat has a predetermined specification,
the waterproof mat is the standard mat having a surface subjected to waterproof treatment,
the up-and-down mat includes a hoisting-and-lowering mechanism, and
the wall-mounted mat is configured to be placed on a wall.

9. The power feed system according to claim 1, wherein the power feed mat is flexible and is rollable into a cylinder.

10. The power feed system according to claim 1, wherein the computer is configured to request the user to select the desired location from among the plurality of locations.

11. The power feed system according to claim 1, wherein the power feed mat includes a plurality of power transmission coils,
the power feed mat is configured to feed electric power to a movable body of the plurality of movable bodies on the power feed mat through at least one of the plurality of power transmission coils,
said each of the plurality of movable bodies includes
a power storage,
a power reception coil configured to receive the electric power from said at least one of the plurality of power transmission coils,
a charging circuit configured to charge the power storage with the electric power received by the power reception coil, and
a controller configured to control the charging circuit,
the controller is configured to
measure a position of the movable body in the subject region,
record the position measured during the prescribed period,
measure a remaining amount of stored power of the power storage, and
record the remaining amount of stored power measured during the prescribed period, and
the computer is configured to obtain the position and the remaining amount of stored power measured during the prescribed period from said each of the plurality of movable bodies through communication with said each of the plurality of movable bodies after the prescribed period elapses.

12. The power feed system according to claim 1, wherein the computer is configured to, in response to determining that there is the improvement strategy, control a movable body of the plurality of movable bodies based on the improvement strategy by rewriting an autonomous driving program of the movable body.

13. The power feed system according to claim 1, further comprising:
an autonomous driving sensor configured to measure a position of said each of the plurality of movable bodies, wherein
the position obtained by the autonomous driving sensor represents the behavior of said each of the plurality of movable bodies.

* * * * *